US012792391B1

(12) United States Patent
Arkoff et al.

(10) Patent No.: US 12,792,391 B1
(45) Date of Patent: Nov. 10, 2026

(54) GOVERNANCE CONTROL PLANE FOR ARTIFICIAL INTELLIGENCE AGENT EXECUTION IN REGULATED ENVIRONMENTS

(71) Applicant: Onesource Solutions International, Inc., Sudbury, MA (US)

(72) Inventors: Harold Arkoff, Sudbury, MA (US); Vedran Jukic, Trieste (IT)

(73) Assignee: OneSource Solutions International, Inc., Sudbury, MA (US)

( * ) Notice: Subject to any disclaimer, the term of this patent is extended or adjusted under 35 U.S.C. 154(b) by 0 days.

(21) Appl. No.: 19/565,179

(22) Filed: Mar. 12, 2026

Related U.S. Application Data

(63) Continuation-in-part of application No. 19/276,173, filed on Jul. 22, 2025, now Pat. No. 12,580,768.

(51) Int. Cl.
*G06F 9/48* (2006.01)

(52) U.S. Cl.
CPC .................................... *G06F 9/48* (2013.01)

(58) Field of Classification Search
CPC ................................ G06F 9/48; G06F 9/4806
See application file for complete search history.

(56) References Cited

U.S. PATENT DOCUMENTS 10,540,205 B2 * 1/2020 Shear .................... G06F 9/5072
12,169,802 B1 * 12/2024 Eldan .................... G06F 16/176
2021/0133329 A1 * 5/2021 Andrews ............... G06F 21/577
2021/0133336 A1 * 5/2021 Andrews ............... G06F 21/602
2022/0198043 A1 * 6/2022 Kozlowski .............. G06F 21/53
2023/0043991 A1 * 2/2023 Comer .................... G06F 8/443
(Continued)

OTHER PUBLICATIONS

U.S. Pat. No. 12,380,144 B1, Aug. 5, 2025, Arkoff et al., Governed Hospital-to-Home Patient Monitoring Architecture.
(Continued)

*Primary Examiner* — Pierre Vital
*Assistant Examiner* — Zuheir A Mheir
(74) *Attorney, Agent, or Firm* — IP Consulting Group; Michael Razavi; Alfred F. Hoyte, Jr.

(57) ABSTRACT

A computer-implemented governance control plane controls execution of artificial intelligence agents in regulated environments. The governance control plane instantiates an agent execution context bound to metadata including identity, role, credential lineage, jurisdiction, risk classification, purpose constraints, time or session scope constraints, and delegation authority. A supervisory orchestration layer routes governed context to one or more reasoning engines independent of model type or input modality. A policy constraint engine evaluates proposed outputs and proposed actions and generates authorization outcomes selected from allow, deny, modify, defer, or escalate. An execution interface enforces authorization outcomes at runtime prior to effectuation of tool calls or downstream invocations. The governance control plane validates delegation chains, limits privilege inheritance, detects recursion or cycles, monitors obligations within defined time windows, deterministically detects omissions, and applies policy-defined responses. Governed audit records and authorization artifacts provide traceable, tamper-evident governance suitable for regulatory review.

20 Claims, 11 Drawing Sheets

(56) References Cited

U.S. PATENT DOCUMENTS

| | | | | |
|---|---|---|---|---|
| 2023/0153150 | A1* | 5/2023 | Kozlowski | G06F 9/4875 718/108 |
| 2024/0205165 | A1* | 6/2024 | Smith | G06F 9/465 |
| 2024/0256336 | A1* | 8/2024 | Shear | G06F 9/5072 |
| 2025/0061404 | A1* | 2/2025 | Grinberg | G06F 9/44526 |
| 2025/0063083 | A1* | 2/2025 | Grinberg | G06F 40/40 |
| 2026/0019380 | A1* | 1/2026 | Bhat | G06F 9/44505 |
| 2026/0046317 | A1* | 2/2026 | Crabtree | H04L 63/104 |

OTHER PUBLICATIONS

U.S. Pat. No. 12,001,464 B1, Jun. 4, 2024, Arkoff et al., System and Method for Medical Data Governance Using Large Language Models.

U.S. Pat. No. 11,693,990 B1, Jul. 4, 2023, Arkoff et al., Medical Data Governance.

U.S. Pat. No. 11,532,393, Arkoff et al., Medical Data Governance [Parent of U.S. Pat. No. 11,693,990].

U.S. Appl. No. 19/276,173, filed Jul. 22, 2025, Arkoff et al., Direct CIP Parent of instant U.S. Appl. No. 19/565,179—Pending; title to be confirmed from Patent Center. The instant application is a CIP of this application per the filed ADS.

U.S. Appl. No. 18/417,511, filed Jan. 19, 2024, Arkoff et al., Originating Application in the continuity chain—chains through continuations and CIPs to U.S. Appl. No. 19/276,173.

U.S. Appl. No. 19/559,990, filed Mar. 7, 2026, Arkoff et al., Governed Hospital-to-Home Patient Monitoring Architecture—Co-pending related application in the same inventive family; shares common inventors and subject matter relating to AI governance in regulated healthcare environments.

U.S. Appl. No. 19/354,703, filed Oct. 9, 2025, Arkoff et al., System and Method for Non-Bypassable Medical Data Governance of Healthcare Data Operations with Deterministic Output Verification—Co-pending related application in the same inventive family.

U.S. Appl. No 19/698,479, filed Jun. 4, 2026, Arkoff et al., System and Method for Non-Bypassable Medical Data Governance of Healthcare Data Operations with Deterministic Output Verification (CIP)—Co-pending related application; Track One filed.

* cited by examiner

GOVERNANCE CONTROL PLANE FOR ARTIFICIAL INTELLIGENCE AGENT EXECUTION IN REGULATED ENVIRONMENTS

CROSS-REFERENCE TO RELATED APPLICATIONS

This application is a continuation-in-part of U.S. patent application Ser. No. 19/276,173, filed Jul. 22, 2025, which claims priority through a chain of continuations and continuations-in-part to U.S. patent application Ser. No. 18/417,511, filed Jan. 19, 2024.

The disclosures of the foregoing applications are incorporated by reference in their entirety. In the event of inconsistency, the present specification controls. No subject matter is incorporated that would limit claim scope unless expressly stated.

FIELD OF THE INVENTION

The present invention relates to computer-implemented systems for controlling execution of artificial intelligence agents. More particularly, the disclosure relates to a governance control plane architecture configured to define, bind, evaluate, and enforce policy constraints on artificial intelligence agent execution contexts.

The architecture enforces runtime mediation of effectuation through a controlled execution interface operating as a governance boundary.

Within this mediated execution boundary, the system performs action classification, manages lifecycle-governed execution contexts, validates delegation chains with dynamic privilege computation, evaluates required events within defined time windows, detects omissions based on computed absence, and generates tamper-evident governance records.

In representative implementations, the governance control plane processes a request by instantiating an agent execution context and computing a machine-derived action classification.

Policy constraint evaluation produces an authorization outcome that governs whether dispatch or effectuation may proceed through a mediated execution interface. Obligation objects and authorization artifacts generated during evaluation govern omission detection, policy-defined responses, and governed audit recording associated with the mediated execution.

Artificial intelligence systems are increasingly deployed in environments in which generated outputs or actions may have operational, financial, safety, or regulatory consequences and may invoke tools, application programming interfaces, workflow engines, devices, internal services, or downstream systems.

In such environments, execution requires structural runtime controls that bind authority and scope to execution, constrain effectuation according to policy artifacts, govern delegation lineage, enforce obligation satisfaction, and preserve traceable governance state.

In certain embodiments, the governance control plane may operate without dependence on a particular model architecture, training methodology, or input modality.

The governance control plane described herein mediates execution of one or more reasoning engines through policy-defined execution contexts having defined lifecycle semantics. It constrains execution according to authority, role, jurisdiction, purpose, risk classification, temporal scope, and delegation authority.

The system classifies proposed outputs and actions for policy evaluation, enforces authorization outcomes at runtime through a mediation boundary preventing uncontrolled effectuation, detects absence of required events within defined time windows prior to expiration, and generates cryptographically linkable governed audit records suitable for traceability, compliance, and distributed validation.

The invention resides in the field of computer system architecture for controlled execution of artificial intelligence agents in which machine-computed action classification, execution-context-bound policy evaluation, and fail-closed effectuation mediation operate together within a runtime governance control architecture.

Within this integrated control architecture, delegation lineage validation with revocation-aware privilege computation, omission-event generation derived from absence conditions, execution context lifecycle governance, and governed audit recording operate in coordination with the mediated execution interface.

BACKGROUND OF THE INVENTION

Artificial intelligence systems are increasingly integrated into computing environments in which generated outputs may influence downstream processes, invoke external services, modify data stores, control devices, or otherwise produce operational consequences. In many such environments, artificial intelligence systems do not operate in isolation. Instead, they interact with tools, application programming interfaces, workflow engines, internal service endpoints, inter-service interfaces, or other systems capable of producing effects outside the artificial intelligence model itself.

Artificial intelligence systems are also commonly deployed within organizational, institutional, or regulated settings in which authority, role, jurisdiction, purpose, and temporal constraints govern what actions may be taken and under what conditions. In these environments, actions may require supervisory approval, confirmation of required events, satisfaction of policy-defined conditions, validation of delegation authority, or verification of contextual completeness before effectuation.

Existing approaches frequently focus on improving model accuracy, refining prompts, or applying advisory filtering to generated outputs. Such approaches may analyze text after generation, apply moderation logic, or provide warnings to users.

Advisory filtering or post hoc review may not prevent unauthorized actions from being executed, may not uniformly mediate invocation of external tools or services, and may not establish a structural runtime control boundary through which effectuation must pass. In many implementations, reasoning components may directly invoke external capabilities without consistent mediation or enforced policy gating.

Moderation or guardrail systems similarly analyze generated content for policy compliance or safety concerns but typically do not mediate invocation of external capabilities through a structural runtime control boundary. These systems commonly operate as advisory filtering, scoring, or output suppression mechanisms applied after generation and prior to presentation to a user.

Although such systems may evaluate semantic content, they generally do not bind execution authority to structured execution contexts. They also do not derive operational action classifications from structured attributes for policy evaluation, nor do they enforce a mediated effectuation pathway through which invocation of tools, application programming interfaces, workflow engines, devices, or downstream services must pass.

As a result, moderation or guardrail mechanisms alone do not provide a control architecture capable of governing operational effectuation of actions produced by artificial intelligence agents.

In contrast, the disclosed governance control plane structurally interposes a runtime mediation boundary between reasoning components and external effectuation endpoints so that policy evaluation and gating occur prior to dispatch and prior to invocation of external capabilities.

Artificial intelligence deployments may also involve multiple reasoning components or agents that delegate tasks among execution contexts. Permission assignment mechanisms based solely on static role attributes do not account for dynamic delegation lineage, runtime metadata changes, or policy-version-dependent privilege inheritance across chained execution contexts.

Without structured delegation-chain validation and computed privilege sets under policy-defined inheritance limits, recursive delegation, privilege expansion, or ambiguous escalation paths may arise during governed execution.

Certain environments require not only avoidance of prohibited actions but also completion of required events within defined and verifiable time intervals. The absence of a required confirmation, approval, acknowledgment, signal, data source, or artifact may represent a material condition that should alter execution.

Systems relying solely on passive monitoring, advisory alerts, or loosely defined timeout logic may fail to provide reproducible omission detection semantics. In distributed or asynchronous systems, late-arriving events may create ambiguity unless defined window boundaries and expiration conditions are applied.

There is also a need for structural execution context control. In many implementations, contextual metadata such as identity, role, or jurisdiction is attached to requests but is not associated with defined lifecycle semantics, revocation conditions, or invalidation behavior.

Without structured execution context lifecycle management, authority may persist beyond intended scope or survive changes in metadata or policy state.

Traceability and integrity of governance records present additional technical challenges in distributed and regulated computing environments. Event logging mechanisms may record occurrences, but reconstruction of governed execution requires preservation of policy identifiers and versions, delegation lineage, computed privilege scope, obligation state transitions, authorization outcomes, and enforcement decisions applied prior to effectuation.

In regulated environments it is often necessary to reconstruct not only what action occurred, but the execution context under which it was evaluated, the policy artifact version applied, the authority in effect at the time of gating, and whether required obligations were satisfied or omitted before effectuation.

Accordingly, systems capable of structuring governance records and cryptographically linking records to preserve ordering, detect modification, and support reconstruction of execution state are desirable.

A computer-implemented control architecture is therefore needed to mediate effectuation of AI-generated actions through a governed execution interface operating as a fail-closed runtime control boundary.

Within this mediated execution boundary, execution contexts are instantiated, machine-computed action classifications are evaluated under policy artifacts, and authorization artifacts governing effectuation are produced.

Delegation lineage validation, omission-event generation derived from absence of required events, and governed audit recording operate within this mediated control path.

The architecture also monitors required events within defined time windows, detects omissions based on computed absence prior to expiration, and generates tamper-evident governance records preserving policy identifiers, authority scope, and enforcement actions associated with runtime enforcement decisions.

The disclosed governance control plane therefore provides a computer-implemented runtime mediation architecture integrating execution context binding, action classification, effectuation gating through an execution interface, delegation lineage validation, obligation-based omission enforcement, and traceable governed audit recording within a unified control plane.

SUMMARY OF THE INVENTION

The present disclosure provides systems and methods for a computer-implemented governance control plane that manages execution of artificial intelligence agents in environments where generated outputs or actions may produce operational, safety, financial, or regulatory consequences.

In general terms, the invention introduces a runtime governance architecture in which machine-derived action classification and execution-context-bound policy evaluation operate together to determine whether external capabilities may be invoked. These determinations are represented through authorization artifacts that define the conditions under which effectuation may occur.

Effectuation of external capabilities is mediated through a governed execution interface that operates as a fail-closed runtime control boundary. Within this mediated control path, the system performs delegation lineage validation, omission detection derived from absence of required events, and generation of governed audit records that preserve traceability of governance decisions.

In certain embodiments, the governance control plane operates as a runtime enforcement mechanism that controls invocation of external capabilities prior to alteration of external systems, such that policy evaluation and authorization outcomes are applied within the execution path of the computing system rather than as advisory analysis performed after generation of agent outputs.

A common technical characteristic of the embodiments described herein is the integration of execution-context-bound policy evaluation with runtime mediation of effectuation through the execution interface. Governance decisions produced during evaluation are captured in governed audit records associated with the corresponding execution context.

In certain implementations, the governance control plane is implemented as a computer system architecture comprising one or more processors and memory storing executable instructions. The instructions bind execution of artificial intelligence agents to an execution context defined by metadata and applicable policy artifacts. Metadata associated with the execution context may include identity, role, credential lineage, organizational affiliation, jurisdiction, risk classification, purpose constraints, time or session scope constraints, and delegation authority. Based on this metadata, policy artifacts identified by policy identifiers and versions are selected and associated with the execution context prior to routing governed context to one or more reasoning engines.

During operation, the governance control plane computes an action classification for each proposed output or proposed action produced by a reasoning engine. The classification is derived from structured operational attributes associated with the proposal, including attributes such as a referenced capability identifier, a tool descriptor, a parameter schema, a workflow endpoint, a device command type, or a resource scope. When identical structured inputs are evaluated under the same classification logic, the resulting classification may be reproduced consistently. In some implementations, a model-assisted classifier proposes a candidate classification that is validated against capability metadata and policy constraints before it is accepted.

The resulting action classification functions as a structural control input used by a policy constraint engine to determine which constraints apply to the proposal. Based on this evaluation, the policy constraint engine produces an authorization outcome that governs whether and how the proposed output or action may proceed. Authorization outcomes may include allow, deny, modify, defer, or escalate determinations.

Effectuation of external capabilities is governed by the authorization outcome through mediation by the execution interface. Governance therefore occurs as a runtime control mechanism embedded within the computing architecture, rather than as advisory filtering applied after generation.

In some embodiments, the execution interface is positioned as a control boundary between reasoning engines and external capabilities such as tools, application programming interfaces, workflow engines, devices, downstream services, internal service endpoints, or inter-service interfaces. Reasoning engines may generate proposed outputs or proposed actions, but they do not directly invoke external capabilities. Instead, effectuation occurs only through the execution interface under governance control.

In certain embodiments, authorization decisions are represented by structured authorization artifacts containing machine-readable fields including an artifact identifier, an execution context identifier, a policy identifier and version, a permitted scope definition, an expiration condition, and an integrity value or cryptographic signature.

In some implementations the execution interface serves as a sole egress pathway for effectuation. Under such configurations, reasoning engines are prevented from directly invoking external capabilities. Direct invocation attempts may be blocked through mechanisms such as credential isolation, network routing restrictions, access control enforcement, or interception of unauthorized requests. The execution interface applies the authorization outcome to permit, prevent, modify, defer, escalate, or terminate effectuation before any external system is altered.

The governance control plane may also govern delegation among multiple agents or execution contexts. Delegation events are represented within a structured delegation chain and validated according to applicable policy constraints. When delegation occurs, the system computes an effective privilege set for the delegated execution context by applying inheritance limits to the requested scope relative to the privileges held by the delegating execution context and to policy-defined restrictions. In some embodiments, the effective privilege set may be further constrained by temporal scope, obligation state, revocation conditions, or other policy triggers. The governance control plane may additionally detect recursion or cycles within the delegation chain and apply enforcement responses that prevent prohibited delegation patterns.

The governance control plane further enforces policy-defined obligations associated with an execution context. Obligations are represented as obligation objects that specify a required event, a defined start condition, and a time window having an expiration parameter. Events generated by orchestration components, execution mediation, or external systems are normalized into a structured event stream for evaluation.

Omission detection occurs when a required event is not observed in the normalized event stream before expiration of the corresponding time window. In some implementations, evaluation of events uses event-time semantics and watermark processing so that late-arriving events can be handled in a defined and reproducible manner. When a required event is absent at expiration, the governance control plane generates an omission event and applies a policy-defined response that may suspend execution, restrict privileges, block further actions, or otherwise constrain effectuation within the execution context.

Execution contexts themselves may include lifecycle semantics such as activation, restriction, suspension, expiration, or revocation states. Changes in metadata, policy version, delegation status, obligation state, or revocation conditions may cause the governance control plane to invalidate or recompute the execution context. Policy binding therefore operates as a dynamic governance mechanism rather than as a static role assignment.

During operation, the governance control plane generates governed audit records capturing governance-relevant information associated with execution. These records may include policy identifiers and versions, execution context identifiers, action classifications, authorization outcomes, enforcement actions, delegation validation results, computed effective privilege sets, obligation states, omission events, and references to associated governance artifacts.

Governed audit records are appended to an audit record store configured to preserve integrity of stored records and to reveal subsequent modification. In certain embodiments, the audit record store operates using append-only semantics or version-controlled storage mechanisms. Successive records may be cryptographically linked through integrity values derived from prior records, allowing alteration of earlier records to be detected.

In some embodiments, the governance control plane also generates scope disclosure artifacts describing data sources reviewed during evaluation, sources that were unavailable or excluded, and conflicts detected among available sources. When required by policy constraints, delivery or effectuation may be gated until a corresponding scope disclosure artifact is generated or validated.

A scope disclosure artifact may include machine-readable fields such as an execution context identifier, a proposal identifier, identifiers for reviewed data sources, identifiers for unavailable or excluded sources, detected conflicts, a generation timestamp, and a policy identifier and version associated with the applicable policy artifact.

Through these mechanisms, the governance control plane operates as a runtime governance architecture centered on mediation of external operations through the execution interface. Execution-context-bound policy evaluation, machine-computed action classification, delegation lineage validation, omission detection, and governed audit recording cooperate to determine whether external capabilities may be invoked.

The governance control plane may be implemented independently of any particular model architecture, training methodology, or output modality and may be deployed in centralized or distributed computing environments.

The scope of the invention is defined by the appended claims.

DETAILED DESCRIPTION OF THE INVENTION

Definitions

Figure 1:
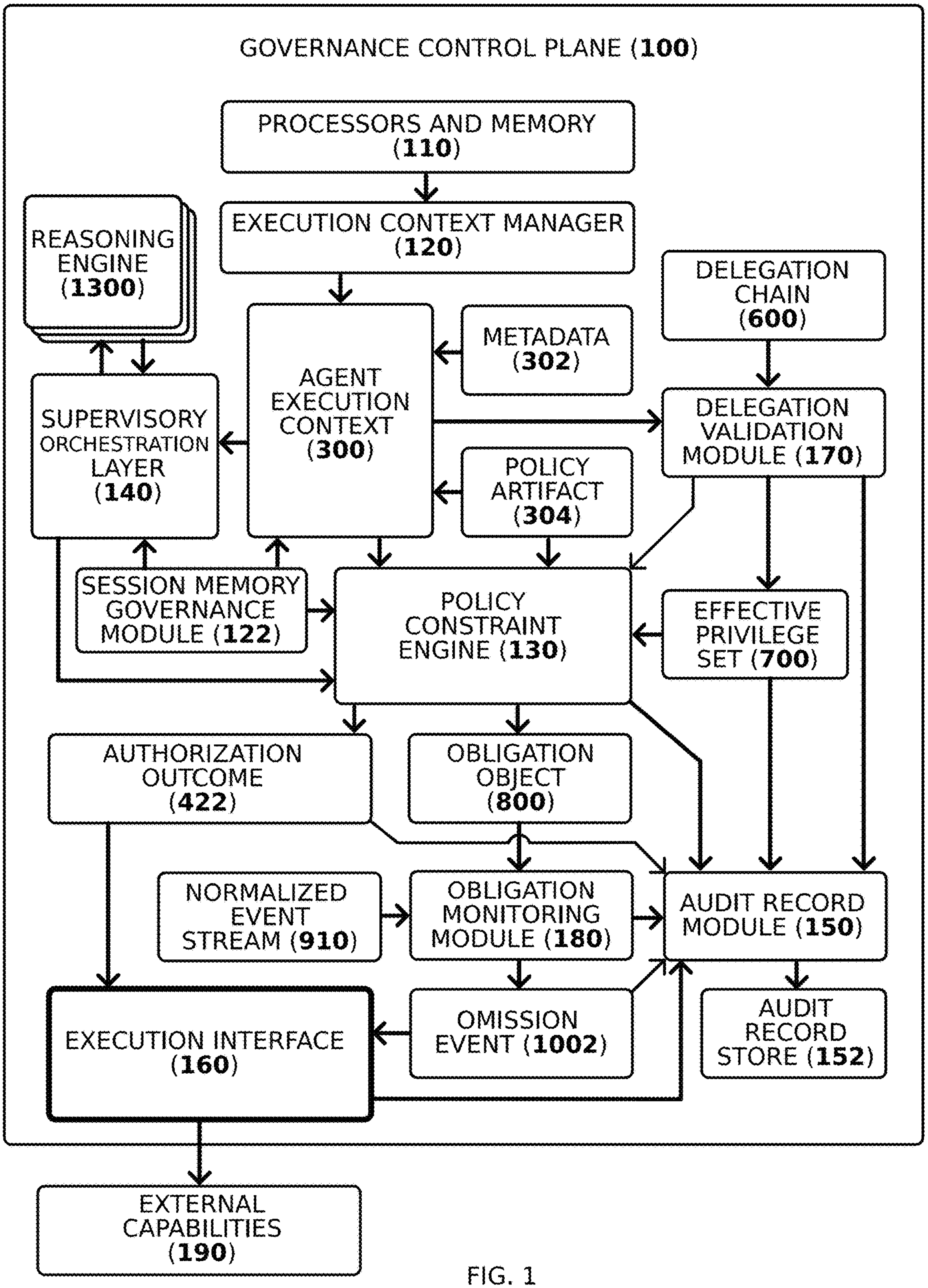
FIG. 1 is a block diagram illustrating an example architecture of a governance control plane for controlling execution of artificial intelligence agents, including execution context construction, policy evaluation, runtime enforcement, delegation governance, obligation monitoring, and generation of governed audit records.

The following definitions are provided for clarity. They describe examples and do not limit the appended claims. Claim terms are interpreted in view of this specification and the claims.

As used herein, an "artificial intelligence agent" or "agent" refers to a software component that, alone or in combination with other software components, produces a proposed output or a proposed action responsive to an input. An agent may include or invoke one or more reasoning engines. An agent may be implemented as a process, service, session, container, or other executable module. The term "agent" is not limited to a particular model architecture, training method, or modality of input or output.

As used herein, a "governance control plane" refers to a computer-implemented control architecture that mediates effectuation of artificial intelligence agent actions through a governed execution interface.

Within this mediated execution boundary, execution contexts are instantiated, machine-derived action classifications are evaluated under policy artifacts, authorization artifacts governing effectuation are produced, delegation lineage is validated to compute effective privileges, omission events are derived from absence of required signals, and governed audit records associated with mediated execution are generated.

The governance control plane may be implemented as one or more services, modules, or components deployed in a centralized, distributed, cloud, on premises, or hybrid environment.

As used herein, a "request" refers to information received by the governance control plane that initiates, conditions, or influences execution of an agent or evaluation by the Reasoning Service 104. A request may comprise one or more inputs presented in a single transmission or across multiple transmissions that are logically associated within an execution context. Such inputs may include text, audio, video, structured data, streaming signal data, embeddings, event driven information, or machine readable contextual representations derived from external systems. A request may originate from a human user, an automated system, a workflow process, or from the detection or availability of new information within the system environment.

In this disclosure, an "ENGRAM derived contextual representation" refers to a machine readable contextual representation produced from prior information and structured for computational use, including embeddings, feature vectors, indexed memory objects, and other representations that can be supplied as governed context and whose use may be constrained by policy. ENGRAM derived contextual representations are an optional input form and are not required in all embodiments.

A "persona agent" refers to an artificial intelligence agent operating under an execution context in which associated metadata and applicable policy artifacts define a persona envelope. The persona envelope may include role attributes, credential lineage, purpose constraints, jurisdictional attributes, risk classifications, or combinations thereof. Use of persona agents is optional.

The term "metadata" refers to structured attributes associated with a request, an execution context, an agent, a proposed output, a proposed action, a tool, a downstream service, or an event. Such metadata comprises descriptive or governing attributes that are maintained in structured form and are accessible to the governance control plane for purposes of policy selection, evaluation, and enforcement. Metadata may include identity, role, credential lineage, organizational affiliation, jurisdiction, risk classification, purpose constraints, temporal or session scope constraints, delegation authority, and other attributes used to determine applicable policy artifacts and to apply corresponding policy constraints during execution.

The term "agent execution context" or "execution context" refers to a computational context instantiated by the governance control plane and bound to metadata, where the execution context defines the scope under which one or more agents and reasoning engines operate. The execution context is used to select and apply one or more policy artifacts and to constrain proposed outputs, proposed actions, and delegation behavior. The execution context may be represented as a data structure, a session object, a containerized runtime, a process boundary, or another computational representation capable of binding metadata and policy constraints to execution. As used herein, the term "execution context" is synonymous with "agent execution context" unless expressly stated otherwise.

In this disclosure, a "purpose constraint" refers to a restriction defining an allowed purpose or use case under which an execution context may operate. A purpose constraint may limit permissible action classification, data access, tool access, or output delivery based on an intended use, workflow stage, or policy-defined purpose.

As used herein, a "time or session scope constraint" refers to a restriction defining temporal scope or session scope for an execution context, including start conditions, expiration conditions, time bounds, session bounds, or other constraints that limit duration, reuse, or persistence.

As used herein, "delegation authority" refers to one or more permissions, attributes, or constraints that determine whether a delegating execution context is permitted to delegate tasks, tool use, data access, or action classification to another execution context, and under what scope. Delegation authority may be derived from identity, role, credential lineage, organizational affiliation, policy constraints, or combinations thereof.

The term "policy artifact" refers to an identifiable representation of policy constraints applicable to a defined execution context. A policy artifact is associated with a policy identifier and a policy version that together distinguish the artifact from other policy representations within the system. The policy artifact comprises a versioned rule set that includes applicability conditions, decision logic, defined authorization outcomes, and enforcement parameters evaluated by the policy constraint engine. Such rule sets may define action classification permissions, obligation requirements, delegation constraints, threshold conditions, and other operational constraints used by the policy constraint engine to evaluate proposed outputs and proposed actions within the execution context.

In this disclosure, a "policy constraint" refers to a rule, condition, threshold, or restriction defined by one or more policy artifacts that governs at least one of permissible actions, permissible outputs, tool access, downstream service invocation, workflow behavior, delegation behavior, obligation requirements, or audit requirements applicable to an execution context.

As used herein, a "policy constraint engine" refers to one or more software modules of the governance control plane that evaluate a proposed output or proposed action using one or more policy artifacts and applicable metadata, and that produce an authorization outcome and, in some embodiments, enforcement parameters, obligation objects, or supervisory escalation conditions.

For purposes of this disclosure, a "supervisory orchestration layer" refers to one or more modules of the governance control plane that route governed context associated with an execution context to one or more reasoning engines, coordinate the processing of requests, and receive proposed outputs or proposed actions generated by the reasoning engines. The supervisory orchestration layer operates without dependence on a specific model architecture and without dependence on a particular output modality.

The term "governed context" denotes information associated with an execution context that is supplied to the Reasoning Service 104 or evaluated by the governance control plane, where that information has been constrained, filtered, or conditioned in accordance with applicable policy constraints prior to use. The governed context comprises validated or normalized data objects together with associated metadata sufficient to permit evaluation and enforcement under applicable policy by the governance control plane.

Metadata may include provenance information, access control attributes, purpose or use restrictions, jurisdictional constraints, timestamps, signal quality indicators, and contextual representations derived from external systems. The governed context is distinct from raw input data and represents a conditioned informational structure prepared to support deterministic reasoning, traceable evaluation, and auditable control of system execution.

In certain embodiments, governed context is represented as one or more machine-readable data objects associated with an execution context and carrying metadata sufficient for policy evaluation and runtime enforcement by the governance control plane.

As used herein, a "reasoning engine" refers to a software component that processes governed context to generate a proposed output or a proposed action. A reasoning engine may be a language model, a planning module, a retrieval system, a classifier, a risk scoring module, a signal analysis module, a workflow module, or another computational module used to produce proposals. The governance control plane may route governed context to one or more reasoning engines, which may include different reasoning engine types.

As used herein, a "proposed output" refers to information generated by a reasoning engine or agent that is intended for delivery to a user interface, a message channel, a downstream system, or another destination, where delivery may cause reliance, trigger downstream operations, or form part of a regulated workflow. A proposed output is subject to policy evaluation and gating prior to delivery.

For purposes of this disclosure, a "proposed action" refers to an operation generated by a reasoning engine or agent that, if effected, would invoke or modify an external system, tool, workflow engine, device, or downstream service. A proposed action is subject to policy evaluation and gating prior to effectuation.

In this disclosure, "action classification" refers to a machine-computed control value derived from structured operational attributes of a proposed action (420) and used by the policy constraint engine to select and apply class-specific policy constraints and enforcement behavior. Action classes may include, without limitation: informational output delivery, workflow invocation, tool or API call, record modification, device command, downstream service invocation, delegation request, or other effectuation. The action classification determines how the proposed action is evaluated and whether dispatch or effectuation is permitted, modified, deferred, escalated, or denied.

The action classification is computed by applying defined transformation logic to structured operational attributes associated with the proposal. The classification is derived from machine-readable fields and capability metadata rather than from semantic interpretation of generated content.

Structured operational attributes used in classification may include an operation-type indicator, a referenced tool or external capability identifier, a tool descriptor identifier (404), an action schema type, a parameter schema or signature, a workflow endpoint identifier, a device command type, a downstream service identifier, a declared resource access scope, or combinations thereof.

Computation of the action classification may involve application of a mapping table, rule set, schema evaluation logic, decision structure, or validated classification module configured to produce a reproducible classification result for identical structured inputs.

The resulting action classification is provided to the policy constraint engine as a control input and determines which policy constraints are evaluated, including permitted scope, required privileges, obligation generation conditions, enforcement parameters, audit recording requirements, and the resulting authorization outcome prior to delivery or effectuation of the proposed output or action.

An "authorization outcome" refers to a policy evaluation result produced by the policy constraint engine in response to evaluation of a proposed output or proposed action within an execution context. The authorization outcome represents a defined decision state derived from application of a policy artifact and may include allow, deny, modify, defer, or escalate determinations as specified by the applicable policy version. The authorization outcome governs gating behavior and directs runtime enforcement applied by the governance control plane with respect to dispatch, execution, modification, or suppression of the proposed output or proposed action.

The term "gating" or "gate execution" refers to controlling whether, when, and how a proposed output or proposed action proceeds, based on an authorization outcome. Gating may include permitting, denying, modifying, deferring, or escalating. Gating is applied prior to effectuation and may include runtime enforcement mechanisms.

The term "effectuation" refers to mediated invocation or execution of a proposed action through the execution interface such that an external tool, application programming interface, workflow engine, device, or downstream service is invoked or altered. Effectuation occurs only after gating under an authorization outcome and constitutes advancement beyond the governance control boundary. Effectuation also includes delivery of a proposed output through the execution interface when such delivery triggers reliance or causes downstream execution in an operational workflow.

The term "runtime enforcement" denotes technical controls executed by the governance control plane during system operation to prevent, suppress, defer, modify, or terminate delivery or effectuation of a proposed output or proposed action. Such enforcement occurs at the point of dispatch, invocation, or execution and is applied prior to, or contemporaneously with, transmission to a user, tool, downstream service, or external system. Runtime enforcement may include withholding dispatch, blocking delivery, preventing initiation of a tool call, suppressing invocation of a downstream service, modifying parameters or scope of execution, applying rate limits, or terminating an invocation that has been initiated but not yet completed.

As used herein, an "execution interface" refers to a mediation component of the governance control plane that intermediates effectuation of proposed actions, including tool calls, application programming interface invocations, workflow actions, device commands, and downstream service invocations. The execution interface applies runtime enforcement based on authorization outcomes. In certain embodiments, the execution interface serves as the pathway through which effectuation is performed under governance control.

As used herein, a "tool" refers to an external or internal capability that may be invoked by a proposed action, including an application programming interface, a workflow endpoint, a device interface, or a service interface. A "tool descriptor" refers to metadata describing a tool, including at least an identifier and a permitted scope definition. Tool descriptors may further include interface definitions, parameter constraints, required privileges, risk attributes, jurisdictional applicability, and logging requirements.

The term "capability metadata" refers to structured metadata associated with an external or internal capability, including tool descriptors and equivalent authoritative metadata representations obtained from registries, manifests, configuration records, or service definitions. Capability metadata defines at least an identifier and one or more scope, parameter, privilege, jurisdictional, or risk constraints and is applied by the execution interface to enforce permitted scope and policy-defined limits prior to effectuation.

A "downstream service" refers to a service, application, workflow system, device, or other computing component that is external to the Reasoning Service 104 and that may be invoked pursuant to a proposed action generated within an execution context. A "downstream invocation" denotes initiation of communication with, or transmission of an instruction to, such a downstream service for the purpose of causing execution of an operation, retrieval of data, modification of state, or performance of a defined function by that service.

In this disclosure, "delegation" refers to transferring or assigning performance of a task, tool use, data access, or an action class from one execution context or agent to another. A "delegation event" refers to an occurrence of delegation that may be represented in a delegation chain and evaluated under policy constraints.

For purposes of this disclosure, a "delegation chain" refers to a representation of delegation among agents or execution contexts for a task or series of tasks. The delegation chain may be represented as a sequence or as a graph of delegation events. The delegation chain may include identifiers corresponding to agents, execution contexts, tasks, or delegation acts.

As used herein, "delegation constraints" refer to restrictions applicable to delegation that may include validation of delegation authority, limitation of privilege inheritance, recursion detection, cycle detection, escalation conditions, revocation conditions, and fallback behaviors.

As used herein, a "revocation condition" refers to a policy-defined state or event upon which previously granted privileges, delegation authority, or authorization associated with an execution context are invalidated or rendered non-operative for purposes of subsequent evaluation or effectuation.

For purposes of this disclosure, "fallback behavior" refers to a policy-defined alternate execution path or constrained operational variant applied when a proposed delegation, proposed action, or authorization condition fails validation under applicable policy constraints.

As used herein, "validate" and "validating" refer to determining whether an action, delegation, obligation satisfaction, or authorization condition meets applicable policy constraints and context metadata. Validation may produce a binary or multi valued result and may trigger gating or enforcement.

An "effective privilege set" refers to the set of permissions that applies to a delegated execution context following evaluation and application of applicable delegation constraints by the governance control plane. The effective privilege set reflects the intersection of permissions available to the delegating execution context and those permitted under the governing policy artifact, as determined at the time of delegation and subject to any temporal, jurisdictional, or purpose based restrictions imposed by policy.

A "privilege inheritance limitation" denotes a restriction enforced during delegation that prevents a delegated execution context from acquiring authority that exceeds either the permissions of the delegating execution context or the bounds established by applicable policy constraints, including restrictions that cap, narrow, condition, or otherwise limit the scope of permissions available to the delegated execution context.

In this disclosure, "recursion detection" and "cycle detection" refer to identifying prohibited repeated patterns in a delegation chain, including repeated identifiers corresponding to an agent identity, an execution context identifier, a task identifier, or a delegation act. Detection of recursion or cycles may trigger denial, suspension, escalation, or other policy-defined response.

As used herein, "escalate" and "escalation" refer to routing a proposed output, proposed action, or delegation for supervisory review, or otherwise requiring a higher authority decision prior to delivery or effectuation.

As used herein, an "obligation" refers to a required condition or required step that must occur under policy. An "obligation object" refers to a data structure associated with an execution context that specifies at least a required event and a time window with an expiration condition. A "required event" refers to an event whose occurrence satisfies an obligation, including acknowledgments, approvals, confirmations, reassessments, logging events, signal presence events, or other policy-defined events.

For purposes of this disclosure, a "time window" refers to a temporal interval during which a required event must occur. An "expiration condition" refers to a condition defining when the time window ends, including an expiration timestamp or a computed expiration based on a start condition.

As used herein, an "event" refers to an occurrence associated with execution, orchestration, mediation, tools, workflows, devices, or downstream services. "Event normalization" refers to transforming events into a consistent schema. A "normalized event stream" refers to a sequence of normalized events that include at least an event type, a timestamp, and an associated execution context identifier.

As used herein, an "omission" refers to a condition in which a required event specified by an obligation object is absent prior to expiration of a time window. An "omission event" refers to a recordable event generated by the governance control plane indicating detection of such an omission. An omission event may be associated with an obligation identifier, an execution context identifier, and policy identifiers and versions.

In this disclosure, a "policy-defined response" refers to an enforcement action or a defined sequence of actions that is applied upon an authorization outcome or upon detection of an omission condition, in accordance with applicable policy constraints. A policy-defined response is specified by a policy artifact and is executed by the governance control plane in response to a determination produced during evaluation of a request, proposed output, or proposed action within an execution context. Such responses may include suspension of execution, reduction of agent autonomy, escalation for supervisory review, issuance of a notification, blocking of further actions within the execution context, revocation or narrowing of authority, or invocation of a remediation workflow.

In this disclosure, a "remediation workflow" refers to one or more policy-defined steps invoked in response to an omission event or other enforcement trigger to restore compliance or satisfy obligations, including generation of instructions, notifications, confirmations, supervisory approvals, or other corrective steps. In some configurations, initiation and completion of a remediation workflow are represented as governance events in the normalized event stream and are evaluated by the governance control plane prior to lifting gating conditions or restoring an execution context to an ACTIVE state.

As used herein, a "scope disclosure artifact" refers to a structured representation associated with a proposed output or proposed action that indicates at least reviewed data sources, unreviewed or unavailable data sources, and conflicts or unresolved conditions. The scope disclosure artifact may be used to support safe reliance and may be recorded in a governed audit record or associated with output delivery. In certain embodiments, a scope disclosure artifact includes structured machine-readable fields comprising at least an execution context identifier, a proposal identifier, one or more reviewed source identifiers, one or more unavailable or excluded source identifiers, detected conflicts or unresolved conditions, a timestamp, and a policy identifier and version associated with the applicable policy artifact.

As used herein, an "audit record store" refers to a storage mechanism that stores governed audit records. The audit record store may be implemented using a database, log, ledger, append only store, object store, or other storage system.

As used in this specification, a "governed audit record" refers to a record appended to an audit record store that captures governance relevant information, including at least a policy identifier and version, an action classification, an authorization outcome, one or more corresponding enforcement actions, delegation validation results, and omission events when present.

An "audit record module" refers to one or more components of the governance control plane that generate, structure, and append governed audit records within an audit record store and, in certain embodiments, establish cryptographic linkage between successive records. The audit record module computes integrity values over stored records, incorporates references to prior records to preserve ordering and continuity, and enforces append only storage semantics to maintain an immutable and verifiable audit sequence.

As used herein, a "prior governed audit record" refers to a governed audit record that precedes another governed audit record in an ordered append sequence within an audit record store. A "current governed audit record" refers to a governed audit record generated after a prior governed audit record and appended subsequently within the ordered sequence.

As used herein, a "prior integrity value" refers to an integrity value computed over a prior governed audit record and stored as part of that prior governed audit record.

In this disclosure, a "hash of prior record" refers to a cryptographic digest derived from at least a prior governed audit record and in certain embodiments from the prior integrity value, for purposes of establishing cryptographic linkage to a current governed audit record.

For purposes of this disclosure, a "current integrity value" refers to a cryptographic or computational digest computed over at least the contents of a current governed audit record and incorporating a hash of prior record, thereby forming a chained cryptographic relationship between successive records.

The term "tamper-evident" refers to a property of a record or record chain such that modification of stored records is detectable. "cryptographically linked" refers to establishing a relationship between records using cryptographic techniques, including hashing, such that alteration of a prior record is detectable from a later record.

"Session memory governance" refers to control over retention, reuse, persistence, or reintroduction of contextual information associated with an execution context in accordance with applicable policy constraints. Session memory governance governs whether contextual data generated during execution may be stored, recalled, extended into subsequent interactions, or discarded, based on policy evaluation and associated metadata.

A "session memory governance module" denotes a system component that implements and enforces session memory governance through application of policy artifacts to contextual data at the time of creation, during continued execution, and upon termination or transition of an execution context. The module evaluates contextual data against applicable policy constraints and associated metadata to determine whether such data may be retained, reused, persisted, extended to subsequent interactions, or required to be discarded. The module enforces limits derived from temporal bounds, token or size constraints, purpose limitations, privacy requirements, changes in metadata attributes, or modification of the governing policy version applicable to the execution context.

As used herein, a "regulated environment" refers to an environment in which operation is subject to compliance requirements, safety rules, institutional policies, regulatory constraints, auditability requirements, or traceability requirements. Regulated environments include, by way of example, healthcare, finance, industrial safety, defense, and governmental settings, without limiting the invention to such settings.

A "first governance control plane" and a "second governance control plane" refer to separate instances of the governance control plane operating at different computing nodes or system boundaries. The first governance control plane may generate an authorization artifact under policy constraints applicable at its node. The second governance control plane may independently validate that authorization artifact before permitting effectuation of a proposed action. The policy artifacts applied at the respective nodes need not be identical, provided that validation is performed under the locally applicable constraints.

As used herein, a "timestamp" refers to a machine readable temporal indicator associated with a governed audit record or event, representing at least a time of generation, evaluation, authorization, or effectuation. A timestamp may be expressed in coordinated universal time or another time standard sufficient to support deterministic ordering and audit reconstruction.

As used herein, an "authorization artifact" refers to a structured governance record generated by the governance control plane that represents an authorization outcome and defines conditions under which delivery or effectuation of a proposed output or proposed action is permitted. In certain embodiments, an authorization artifact includes structured machine-readable fields comprising at least an artifact identifier, an execution context identifier, a policy identifier and version, a permitted scope definition, an expiration condition, and an integrity value or cryptographic signature used for validation.

An "integrity value" refers to a cryptographic or computational digest computed over at least a portion of a governed audit record, authorization artifact, or related governance data structure for the purpose of detecting alteration or tampering. The integrity value is derived through application of a defined cryptographic or computational transformation to the underlying data and is stored or transmitted in association with the corresponding record. Computation of the integrity value may employ a hashing function, digital signature process, message authentication code, or other cryptographic mechanism capable of enabling verification that the protected data has not been modified since the integrity value was generated.

As used herein, an "authorization artifact integrity value" refers to a cryptographic or computational digest associated with an authorization artifact and computed over at least a portion of the authorization artifact contents for purposes of validating integrity during cross node transmission or validation.

"Authorization artifact validation" refers to evaluation of a received authorization artifact to determine whether the artifact is authentic, unmodified, unexpired, and applicable under locally applicable policy constraints at the time of use. Validation is performed by the governance control plane or by a designated validation component prior to acceptance of the artifact for purposes of permitting a proposed action or recognizing delegated authority. Such validation may include verification of an integrity value associated with the authorization artifact, confirmation of execution context identifiers, confirmation of defined scope parameters, assessment of expiration or temporal conditions, and verification of associated policy identifiers and policy versions to ensure correspondence with locally enforced policy artifacts.

In this disclosure, "authorization artifact integrity verified" refers to a validation state indicating that an authorization artifact integrity value has been successfully validated against a recomputed or independently verified digest, thereby indicating absence of detectable tampering.

For purposes of this disclosure, "scope disclosure verification confirmed" refers to a validation state indicating that a required scope disclosure artifact has been verified as present, applicable to a corresponding execution context, and consistent with a proposed action under applicable policy constraints.

A "delegation validation module" refers to one or more components of the governance control plane that evaluate proposed delegation events and determine whether delegation authority exists under applicable policy constraints and within the bounds of the delegating execution context. The delegation validation module validates asserted delegation authority, computes the effective privilege set applicable to the delegated execution context, detects recursive delegation patterns or cyclical delegation chains, and enforces delegation constraints defined by the governing policy artifact.

System Architecture

The governance control plane is implemented as a computer system architecture comprising one or more processors and memory storing executable instructions. The instructions, when executed, cause the processors to perform the control functions described herein. The governance control plane may be deployed within a single computing node or distributed across multiple computing nodes that communicate over one or more networks. The components described below may be implemented as software modules, services, processes, containerized runtimes, virtualized instances, or combinations thereof.

The governance control plane includes an execution context manager configured to instantiate and maintain agent execution contexts. The execution context manager binds metadata to each execution context and associates the execution context with one or more policy artifacts identified by policy identifiers and versions. The execution context manager maintains execution contexts in memory as data structures, session objects, containerized runtimes, process boundaries, or other computational representations capable of binding metadata and policy constraints to execution.

The governance control plane includes a policy constraint engine configured to evaluate proposed outputs and proposed actions under applicable policy artifacts. The policy constraint engine retrieves metadata associated with the relevant execution context and applies policy constraints defined by the selected policy artifacts to structured operational attributes of the proposal.

In representative implementations, the governance control plane processes a request by instantiating an execution context and computing a machine-derived action classification.

Policy evaluation is performed under the execution context to produce an authorization outcome, and dispatch or effectuation is mediated through a fail-closed execution interface.

Obligation objects and authorization artifacts generated during evaluation govern omission detection, policy-defined responses, and governed audit recording associated with the mediated execution.

The policy constraint engine generates enforcement parameters and structured governance artifacts derived from execution-context-bound policy evaluation, including authorization artifacts and scope artifacts governing mediated effectuation of external operations.

These artifacts are supplied to the execution interface, which mediates delivery or effectuation under the authorization outcome.

Associated modules use the artifacts to perform delegation validation, obligation monitoring, and cross-node validation within the mediated governance path.

The policy constraint engine may be implemented as a rule evaluation module, decision engine, or other deterministic constraint-processing logic configured to apply versioned policy artifacts to structured inputs such that identical inputs evaluated under the same policy version produce an identical authorization outcome.

A supervisory orchestration layer coordinates interaction between execution contexts and one or more reasoning engines. The layer routes governed context associated with a particular execution context to the selected reasoning engine and receives proposed outputs and proposed actions generated in response.

Each proposal is bound to its originating execution context upon receipt. The supervisory orchestration layer preserves this association so that the policy constraint engine evaluates the proposal under the correct metadata and policy artifact before any dispatch, invocation, or further system processing occurs.

When effectuation of a proposed action involves invocation of an external capability, the governance control plane includes an execution interface responsible for mediation of that invocation. In certain embodiments, the execution interface may be implemented as an effectuation mediation component that intermediates invocation of external capabilities and enforces authorization outcomes prior to effectuation.

The execution interface mediates effectuation of tool calls, application programming interface invocations, workflow actions, device commands, and downstream service invocations.

The interface applies authorization outcomes and enforcement parameters at runtime. Depending on the evaluated authorization state, the interface permits, prevents, modifies, defers, escalates, or terminates the proposed action in accordance with the evaluated authorization outcome.

In configurations where the execution interface is designated as the effectuation pathway, invocation of external capabilities occurs through the execution interface rather than directly from a reasoning engine. This structural placement establishes a control boundary between reasoning components and external systems.

The execution interface operates using capability metadata as defined in the Definitions to enforce permitted scope and policy-defined limits prior to effectuation.

External capabilities may include internal service endpoints or inter-service interfaces within a distributed system. The execution interface mediates invocation of such internal services in the same manner as tool calls and downstream service invocations. As a result, reasoning engines are not permitted to directly invoke internal services outside the governance control boundary.

The governance control plane includes a delegation validation module that represents and evaluates delegation chains within and across execution contexts. The delegation validation module computes effective privilege sets and enforces delegation constraints, including privilege inheritance limitations, revocation conditions, time-bounding semantics, and recursion or cycle detection, as defined in the Definitions and Delegation Governance description. Delegation validation results are supplied to the policy constraint engine and execution interface for enforcement and are recorded in governed audit records.

The governance control plane includes an obligation monitoring module configured to maintain obligation objects associated with execution contexts and to evaluate those obligation objects against a normalized event stream. The obligation monitoring module generates omission events under deterministic temporal conditions and supplies omission determinations to the execution interface and policy constraint engine for enforcement, as defined in the Definitions and Obligation Monitoring description.

The governance control plane includes an audit record module configured to generate and append governed audit records to an audit record store. The audit record module applies integrity computation and cryptographic linkage as defined in the Definitions to provide tamper-evident ordering and modification detection across successive records.

In some embodiments, the governance control plane includes a session memory governance module that controls retention, reuse, or persistence of contextual information associated with execution contexts. The session memory governance module evaluates contextual information against applicable policy artifacts and associated metadata and determines whether such information may be retained, reused within the same execution context, extended to a subsequent interaction, or required to be discarded. The module enforces limits derived from temporal bounds, token or size constraints, purpose limitations, privacy requirements, jurisdictional restrictions, or changes in metadata attributes or governing policy artifacts applicable to the execution context.

In distributed embodiments, authorization artifacts and scope disclosure artifacts generated at a first node may be transmitted to a second node and validated prior to effectuation. Validation is performed in accordance with the authorization artifact validation semantics defined in the Definitions, including integrity verification, expiration checks, scope correspondence, and policy identifier confirmation. Validation results and cross-node enforcement actions are recorded in governed audit records.

The described components may communicate through defined interfaces within a single process space or across distributed services. The governance control plane does not require a specific hardware configuration and may operate on general purpose computing hardware or specialized computing infrastructure.

Together, these components integrate policy evaluation, scope disclosure and authorization artifact generation, runtime enforcement, delegation validation, obligation monitoring, omission detection, and governed audit recording prior to delivery or effectuation of proposed outputs and proposed actions.

Overview of the Governance Control Plane

The disclosed system implements a governance control plane that controls execution of artificial intelligence agents within defined execution contexts. The governance control plane is implemented as a system architecture comprising one or more processors and memory storing executable instructions. The governance control plane may be deployed in centralized or distributed computing environments, including cloud, on premises, or hybrid deployments.

The governance control plane operates by binding artificial intelligence agent execution to an execution context defined by metadata and applicable policy artifacts. A reasoning engine does not directly invoke external actions. Instead, proposed outputs and proposed actions are evaluated prior to delivery or effectuation, and authorization outcomes are enforced at runtime. Governance is therefore embedded in the computing architecture itself, rather than applied as post-generation filtering.

The governance control plane may include a supervisory orchestration layer configured to route governed context associated with an execution context to one or more reasoning components. The reasoning components generate structured proposals, including proposed outputs or proposed actions, which are returned to the governance control plane for evaluation. The governance control plane further includes a policy constraint engine that evaluates each structured proposal under applicable policy artifacts and produces an authorization outcome used for gating and runtime enforcement.

Prior to policy evaluation, the governance control plane computes an action classification for each structured proposal. The action classification determines which policy constraints are evaluated, including permitted scope, required privileges, obligation generation conditions, and escalation requirements, and thereby conditions the resulting authorization outcome and gating behavior.

An execution interface mediates effectuation of external invocations and operates as the runtime execution boundary for governed operations.

Delegation validation, omission-event generation derived from absence conditions, and governed audit recording operate within this mediated execution path to enforce authorization artifacts and policy responses produced during policy evaluation.

The governance control plane may additionally generate scope disclosure artifacts associated with proposed outputs or proposed actions. Authorization artifacts may also be generated and validated across computing nodes prior to effectuation where distributed enforcement is implemented.

In certain embodiments, the governance control plane may operate with a variety of model architectures, training methods, or output modalities. The disclosed system may operate with language models, planning engines, retrieval systems, classification engines, signal analysis modules, workflow engines, or combinations thereof. Policy evaluation, delegation validation, obligation monitoring, scope disclosure generation, authorization artifact generation, and runtime enforcement are performed independently of how reasoning is implemented and independently of how outputs are expressed.

Requests received by the governance control plane may comprise text, audio, video, structured data, signal streams, embeddings, event triggered information, ENGRAM derived contextual representations, or other machine readable representations. The governance control plane binds such requests to an agent execution context and applies policy constraints without regard to input modality.

In some implementations, execution is initiated or updated in response to availability of new information generated by monitored systems or data sources, and such updates are governed under the applicable execution context and policy artifacts.

The following example illustrates an integrated runtime sequence performed by the governance control plane. A user request 202 is received to initiate a medication order update within a regulated environment. In response, the governance control plane instantiates an agent execution context 300 bound to metadata including role, jurisdiction, risk classification, and delegation authority 204. Governed context is routed to one or more reasoning agents 206, and the system receives a proposed action 420 specifying a tool invocation to submit an order update to an external record system 208. The governance control plane determines an action classification 410 of WRITE_OR_COMMIT_RECORD based on a tool descriptor 404 indicating a state changing commit operation. Policy constraint evaluation 210 applies policy constraints associated with WRITE_OR_COMMIT_RECORD actions at the applicable risk classification, including a supervisory approval requirement and a time window obligation.

Because supervisory approval has not been satisfied, the governance control plane generates an authorization outcome 422 indicating a DEFER authorization outcome and gates execution 212 by withholding dispatch through the execution interface 160. A governed audit record 1004 is appended capturing the action classification, policy evaluation results, and the defer determination 222. The system creates an obligation object 800 requiring receipt of a supervisory approval event of type SUPERVISOR_APPROVAL_GRANTED within a defined time window. The obligation monitor evaluates the normalized event stream

910 against a computed expiration timestamp associated with the obligation object. If no approval event is observed prior to expiration, the governance control plane generates an omission event 1002, transitions the execution context to a SUSPENDED or RESTRICTED lifecycle state, applies a policy-defined response 220 including escalation and continued blocking of effectuation, and appends a governed audit record reflecting the omission determination 222.

Agent Execution Context

In one aspect, the governance control plane instantiates an agent execution context in response to receipt of a request. The agent execution context is programmatically bound to metadata that defines and constrains the scope of permitted execution within the system. Metadata may include identity, role, credential lineage, organizational affiliation, jurisdiction, risk classification, purpose constraints, temporal or session scope constraints, delegation authority, or combinations of these attributes, and is evaluated by the governance control plane to determine authorized operations, accessible resources, and permissible actions during the lifetime of the execution context.

The execution context serves as a computational boundary within which reasoning occurs and within which proposed outputs and proposed actions are evaluated and governed. The execution context is used to select and associate one or more policy artifacts identified by policy identifiers and versions. The selected policy artifacts define policy constraints applicable to the execution context, including constraints on permissible actions, delegation behavior, obligation requirements, enforcement parameters, and audit requirements.

Selection of policy artifacts based on metadata enables enforcement of differing constraints for differing roles, jurisdictions, risk classifications, purposes, or time scopes without altering the reasoning engine itself. Policy is bound to execution at the context level rather than applied after generation.

The execution context may further serve as the anchor for delegation validation, computation of effective privilege sets, creation of obligation objects, association of scope disclosure artifacts, and generation of governed audit records. All proposed outputs and proposed actions are associated with the execution context prior to delivery or effectuation.

The execution context may be implemented as a logical construct within memory, as a data structure associated with a session, as a containerized process, as a process boundary, or as another computational representation capable of binding metadata and policy constraints to execution.

Supervisory Orchestration Layer

The governance control plane includes a supervisory orchestration layer that routes governed context associated with an execution context to one or more reasoning engines. The governed context is constrained by applicable policy artifacts bound to the execution context prior to routing. The supervisory orchestration layer coordinates invocation of reasoning engines and receives proposed outputs or proposed actions generated thereby.

In certain embodiments, the supervisory orchestration layer operates without requiring a particular internal model architecture. The governance control plane can operate with different reasoning engines, regardless of model type, parameter count, training methodology, or inference mechanism. It supports multiple input and output modalities. Requests may originate from text, audio, video, structured data, signal streams, embeddings, event-triggered information, ENGRAM-derived contextual representations, or other machine-readable formats. Proposed outputs may include text delivered to a user interface. Proposed actions may include workflow steps, tool invocations, application programming interface calls, device commands, or other effectuatable operations.

Policy Evaluation and Authorization Outcomes

When a proposed output or proposed action is received from one or more reasoning engines, the governance control plane determines an action classification associated with the proposal. The action classification identifies the type of operation represented by the proposal, including whether the proposal involves output delivery, notification, workflow execution, tool invocation, application programming interface invocation, device control, or downstream service interaction.

A policy constraint engine evaluates the proposed output or proposed action against one or more policy constraints defined by at least one policy artifact selected for the agent execution context. The evaluation is performed using metadata bound to the execution context and, when applicable, a tool descriptor corresponding to a referenced external capability.

The evaluation produces an authorization outcome selected from allow, deny, modify, defer, or escalate. In certain embodiments, the policy constraint engine may additionally generate enforcement parameters, one or more obligation objects, or supervisory escalation conditions based on applicable policy constraints.

In certain embodiments, the policy constraint evaluation represented as step (210) is implemented as a sequence comprising policy evaluation and a gating decision that selects an enforcement path based on the resulting authorization outcome.

The authorization outcome (422) represents the computed result of policy evaluation (608), and gating decision (610) applies that authorization outcome to determine the enforcement path, together constituting the policy constraint evaluation stage (210).

The policy constraint engine may generate a scope disclosure artifact associated with a proposed output or proposed action. The scope disclosure artifact may identify reviewed data sources, unavailable or unreviewed sources, sources excluded under applicable policy constraints, and detected conflicts among data inputs. The artifact is associated with the proposal prior to delivery or effectuation.

The authorization outcome determines whether, and under what conditions, the proposed output or proposed action may proceed. The governance control plane gates execution in accordance with the authorization outcome before delivery or effectuation occurs.

When a proposed action involves interaction with an external capability, the authorization outcome and any applicable enforcement parameters are applied through runtime enforcement. Runtime enforcement is performed through mediation by the execution interface, which controls effectuation in accordance with the applicable execution context and policy constraints.

Action Classification Computation

The governance control plane computes an action classification for each proposed output or proposed action prior to policy evaluation and prior to gating. The action classification is produced by executing deterministic classification logic over structured operational attributes associated with the proposal. In certain embodiments, identical structured operational inputs evaluated under the same applicable policy version and mapping logic produce a consistent action class identifier.

Structured operational attributes may include an operation-type indicator, an identifier of a referenced external capability, a tool descriptor identifier (404), an action schema type, a parameter schema or parameter signature, a workflow endpoint identifier, a device command type, a downstream service identifier, a resource access scope, or combinations thereof.

The action classification is computed by applying one or more mapping rules, decision tables, executable rule sets, or configuration-defined classification modules derived from policy artifacts (304) or maintained classification rules. Execution of the classification logic produces a discrete action class identifier (410) supplied to the policy constraint engine (130) as a control input for constraint selection and runtime enforcement.

In certain embodiments, the governance control plane computes the action classification (410) by performing schema matching on the proposed action (420), evaluating structured fields contained in or referenced by a tool descriptor (404), and executing rule evaluation logic against the resulting structured representation to produce the action class identifier.

For example, where a referenced tool descriptor includes a side-effect indicator denoting a state-changing operation together with an operation-type attribute corresponding to "write," "commit," or "update," the resulting classification may correspond to WRITE_OR_COMMIT_RECORD. Where the tool descriptor indicates export, disclosure, or transmission of regulated data outside a defined boundary, the classification may correspond to EXPORT_OR_DISCLOSE_REGULATED_DATA. Where structured attributes reflect read-only retrieval without state change, the classification may correspond to READ_DATA. Where the proposed action declares a structured action-type field associated with notification or message dispatch, the classification may correspond to NOTIFY_OR_DISPATCH. Where the proposal references a device-capability descriptor or includes a structured device-command indicator, the classification may correspond to DEVICE_OR_SERVICE_COMMAND.

In implementations where multiple candidate mappings apply to a single proposed action, the governance control plane may resolve the classification deterministically using a policy-defined precedence rule, dominance hierarchy, or maximum-risk ordering, and may apply the strictest applicable constraints for authorization evaluation and runtime enforcement.

In particular implementations, a policy artifact designates one or more action classifications as restricted under defined contextual conditions, including conditions based on role, jurisdiction, risk classification, purpose constraint, delegation state, or obligation state. Detection of a restricted action classification may trigger a deny, modify, defer, or escalate authorization outcome prior to permitting delivery or effectuation.

In certain embodiments, a model assisted classifier proposes a candidate action class identifier based on analysis of the structured proposal. The governance control plane validates the candidate classification against the referenced tool descriptor (404), action schema constraints, structured operational attributes, and applicable policy artifacts (304). The candidate classification is accepted only when consistent with the structured attributes and defined constraints. If inconsistency is detected, the governance control plane reclassifies the proposal deterministically using rule based logic or escalates according to policy-defined response conditions. Only a validated action classification (410) is supplied to the policy constraint engine (130) for authorization evaluation.

The computed action classification (410) is used by the policy constraint engine to select applicable constraints, determine permissible scope, determine required privileges, determine whether enforcement parameters, obligation objects (800), scope disclosure artifacts (1250), or authorization artifacts (1200) are required, and determine whether effectuation through the execution interface (160) is permitted. Because action classification is computed prior to gating and is used to control runtime mediation, the action classification operates as a structural control input enabling policy constrained enforcement based on operational characteristics of the proposed output or proposed action.

Action classifications are not limited to predefined enumerations and may be explicitly declared or deterministically derived from structured operational attributes, including capability metadata and side-effect indicators, using defined mapping or rule logic to control policy selection and execution-interface mediation of effectuation. Regardless of derivation mechanism, the resulting classification remains reproducible for identical structured operational inputs evaluated under the applicable rule set and policy version.

In certain embodiments, action classification (410) is determined prior to policy evaluation and authorization outcome generation, such that proposed outputs or proposed actions are evaluated only after an action class identifier has been determined or validated.

Action Classification Taxonomy and Conflict Handling

In certain embodiments, the governance control plane maintains an action-class taxonomy comprising policy-relevant classes used for constraint selection, authorization evaluation, and runtime enforcement. By way of example and not limitation, action classes may include one or more of: RESPONSE_ONLY_DELIVERY, READ_DATA, EXPORT_OR_DISCLOSE_REGULATED_DATA, INVOKE_TOOL, INVOKE_WORKFLOW, NOTIFY_OR_DISPATCH, WRITE_OR_COMMIT_RECORD, DEVICE_OR_SERVICE_COMMAND, PAYMENT_OR_FINANCIAL_COMMIT, or ADMINISTRATIVE_CONFIGURATION.

A proposed action (420) may correspond to multiple candidate action classes based on its structured operational attributes. In such cases, the governance control plane resolves the classification deterministically according to a policy-defined conflict resolution rule set, such that identical structured inputs evaluated under the same policy version and conflict-resolution rule set yield a consistent resolved action class identifier.

Conflict resolution may involve selecting a maximum-risk class according to a predefined ordering, computing a composite classification treated as the strictest applicable class for authorization evaluation and gating, or applying a dominance rule set defined in the applicable policy artifact (304).

Where a proposal includes both a read component and a write component, the resolved classification may correspond to WRITE_OR_COMMIT_RECORD for purposes of authorization evaluation and runtime mediation.

When an authorization outcome indicates "modify," the governance control plane and/or the execution interface applies a modification rule set corresponding to the resolved action classification.

The modification rule set may restrict permissible parameters, reduce scope, substitute permitted endpoints, redact regulated fields, insert required confirmations, segment composite actions, or transform the proposed action into a permitted variant consistent with applicable policy constraints.

The modified action is evaluated to confirm that it remains within the permitted scope associated with the resolved action classification prior to effectuation.

By way of example, a proposed action generated by a reasoning engine may be classified as a workflow invocation through action classification (410). Policy evaluation performed by the policy constraint engine may determine that the proposed action is permitted only after completion of a required supervisory event associated with an obligation object. The resulting authorization outcome (422) may therefore specify a defer result, and the governance control plane applies a gating decision that prevents effectuation through the execution interface (160) until the prerequisite condition is satisfied. If the required event is not detected in the normalized event stream prior to expiration of a defined time window, an omission event is generated and the governance control plane applies a policy-defined response that blocks or suspends the proposed action such that effectuation does not occur.

Runtime Enforcement and Execution Interface

For clarity, a "proposed action" refers to a structured operation generated by a reasoning engine prior to runtime mediation. "Dispatch" refers to release or forwarding of a proposed action to the execution interface for potential effectuation. "Effectuation" refers to actual invocation or execution of an external capability, including a tool, application programming interface, workflow endpoint, device interface, or downstream service. In certain embodiments, dispatch and effectuation are distinct stages, and gating may occur at either stage. Prevention of dispatch prevents forwarding to the execution interface, while prevention of effectuation prevents alteration of an external capability.

In some configurations, proposed actions that would result in effectuation are mediated through an execution interface of the governance control plane. The execution interface is a mediation component positioned between one or more reasoning engines and external capabilities including tools, application programming interfaces, workflow engines, devices, or downstream services.

The execution interface receives proposed actions after policy evaluation and applies the authorization outcome generated by the policy constraint engine. The authorization outcome may be allow, deny, modify, defer, or escalate. In one implementation, the execution interface also receives enforcement parameters, effective privilege limitations resulting from delegation validation, and, when applicable, a scope disclosure artifact or authorization artifact associated with the proposed action.

The execution interface enforces the authorization outcome prior to effectuation. If the authorization outcome is allow, effectuation proceeds within the authorized scope. A deny outcome prevents effectuation. A modify outcome adjusts parameters or scope in accordance with policy constraints. A defer outcome withholds dispatch pending satisfaction of a prerequisite condition. An escalate outcome routes the action for supervisory review. When the authorization outcome is defer, the execution interface withholds dispatch until a prerequisite event, condition, obligation satisfaction, or artifact validation requirement is satisfied. When the authorization outcome is escalate, the governance control plane routes the proposed action for supervisory review prior to permitting effectuation.

In some implementations, dispatch is withheld upstream of the execution interface; in other implementations, the execution interface receives the proposed action and withholds onward effectuation.

Runtime enforcement may include withholding dispatch of a workflow action, blocking delivery of an output that would trigger reliance or downstream execution, preventing invocation of a tool or application programming interface, suppressing a downstream invocation, modifying parameters associated with the invocation, applying privilege caps derived from an effective privilege set, or terminating an in progress invocation. Enforcement occurs within the computing architecture before external systems are altered.

The execution interface applies capability metadata associated with a referenced capability to determine whether a proposed action remains within authorized scope prior to effectuation.

Prior to permitting effectuation, the execution interface evaluates the proposed action against applicable capability metadata, the selected policy artifact, and any computed effective privilege set, and denies effectuation when the invocation exceeds authorized scope or violates applicable constraints.

In certain embodiments, an external capability includes an internal service endpoint or inter-service interface within a distributed system, such that internal service calls are mediated and governed in the same manner as tool calls and downstream invocations.

In embodiments in which policy constraints require scope disclosure, the execution interface may verify that a required scope disclosure artifact is generated and associated with the proposed action prior to permitting delivery or effectuation. In distributed embodiments, the execution interface may validate an authorization artifact prior to permitting effectuation at a receiving node.

The execution interface may maintain a record of attempted, permitted, modified, deferred, denied, escalated, or terminated actions and supply such information to the audit record module for inclusion in governed audit records.

The execution interface may be implemented as a gateway, proxy, middleware component, wrapper, broker, or other mediation mechanism capable of intercepting and controlling effectuation requests. The execution interface may operate within a single computing node or across distributed nodes. The execution interface operates independently of the internal architecture of any reasoning engine and independently of input or output modality.

Execution Interface Placement and Control Boundary

In certain embodiments, the execution interface establishes a control boundary within the governance control plane such that effectuation of proposed actions is performed under mediated control rather than directly by a reasoning engine. In that configuration, proposed actions generated by reasoning engines are not directly executed against external tools or services. Instead, the proposed actions are routed to the execution interface for evaluation and enforcement under the applicable execution context and policy artifact.

The execution interface may be configured as the pathway through which effectuation occurs under governance control. In implementations in which the execution interface is designated as the pathway for effectuation, invocation of external tools, application programming interfaces, workflow engines, devices, or downstream services occurs through the execution interface.

The execution interface may maintain or access a registry of permitted tools and associated descriptors. When a proposed action references a tool or downstream capability, the execution interface may verify that the referenced capability is registered and that invocation is permitted under the applicable execution context, effective privilege set, and policy artifact.

The execution interface may also enforce restrictions on direct network access, credential use, or invocation channels by reasoning engines in order to ensure that effectuation is mediated under governance control. Such restrictions may be implemented using access control mechanisms, network controls, service wrappers, credential isolation, or other technical measures appropriate to the deployment environment.

The governance control plane establishes a control boundary at the point of effectuation. Policy evaluation is applied before any external system is invoked or altered. This placement allows enforcement of authorization outcomes, delegation constraints, obligation-related responses, scope disclosure requirements, and authorization artifact validation before operational consequences occur. The boundary is defined by governance function rather than by any particular hardware topology.

Sole Egress Enforcement and Bypass Prevention

In some configurations, the execution interface (160) is implemented as the sole egress pathway through which effectuation of proposed actions may occur. Sole egress means that reasoning engines (1300), execution contexts (300), or other internal components are not permitted to directly invoke external capabilities (190), internal service endpoints, workflow engines, application programming interfaces, devices, or downstream services without mediation by the execution interface (160).

In such embodiments, effectuation authority is structurally separated from reasoning logic. Reasoning engines (1300) are configured without direct network credentials, service credentials, cryptographic keys, or routing permissions required to invoke external capabilities. Invocation credentials, capability tokens, service accounts, or cryptographic signing keys required for effectuation are maintained by or accessible exclusively through the execution interface (160).

The execution interface (160) may enforce sole egress semantics through one or more technical control mechanisms including credential isolation, network routing restrictions, service mesh policies, firewall rules, container isolation policies, proxy enforcement, application gateway enforcement, cryptographic signing requirements, or other access control mechanisms appropriate to the deployment environment.

In certain embodiments, external capabilities (190) are configured to accept invocations only from the execution interface (160) or from entities presenting credentials issued or validated by the execution interface. Direct invocation attempts originating from reasoning engines (1300) or other non authorized components may be rejected at the network, service, credential, or application layer.

In illustrative embodiments, absence of mediation by the execution interface results in automatic denial of invocation, such that effectuation fails closed in the absence of valid interface-issued credentials or authorization artifacts.

In particular implementations, each proposed action (420) must be accompanied by an authorization outcome (422), and when required by policy, by a valid authorization artifact (1200), prior to effectuation. The execution interface (160) verifies that the proposed action (420) is associated with a valid execution context (300), a computed action classification (410), and any applicable effective privilege set (700) before permitting invocation of the external capability (190).

Attempts to invoke external capabilities without mediation through the execution interface (160), including attempts using unauthorized credentials, unauthorized routes, expired authorization artifacts, or mismatched execution context identifiers, may be detected as bypass attempts. In one implementation, bypass attempts are recorded as governance events and supplied to the audit record module (150) for inclusion in governed audit records.

In distributed embodiments, sole egress enforcement may be implemented at multiple nodes, including enforcement at a receiving node requiring validation of authorization artifacts prior to permitting invocation of a local external capability. Validation failures or absence of required artifacts may result in denial of effectuation regardless of whether a proposed action was previously authorized at an originating node.

Structural separation of reasoning authority from effectuation authority, credential isolation, network routing restrictions, authorization artifact validation, and logging of bypass attempts collectively enforce a mandatory mediation boundary that prevents unauthorized expansion of execution authority.

Execution Context Lifecycle and Invalidation

In certain embodiments, an agent execution context (300) is not a static label but a stateful computational construct having defined lifecycle semantics. The governance control plane instantiates the execution context in response to a request and binds metadata (302) and one or more policy artifacts (304) to the execution context at creation time. Upon instantiation, the execution context enters an active state in which proposed outputs and proposed actions associated with that execution context are evaluated under applicable policy constraints.

The execution context maintains lifecycle state information indicating whether the execution context is active, restricted, suspended, escalated, expired, revoked, or terminated. The governance control plane drives state transitions based on defined triggering conditions. Lifecycle state is stored in association with the execution context and is used as an input to gating and runtime enforcement prior to delivery or effectuation of proposed outputs or proposed actions. Lifecycle states are mutually exclusive at any given evaluation point and are stored as a discrete state indicator associated with the execution context.

In one implementation, the execution context transitions from an active state to a restricted or suspended state upon detection of an omission event (1002), failure of a required authorization artifact validation, violation of delegation constraints, detection of recursion or cycle within a delegation chain (600), or application of a policy-defined response. While in a restricted or suspended state, the governance control plane prevents routing of proposed actions to the execution interface (160) for effectuation and restricts permissible action classifications (410) or reduces the effective privilege set (700) associated with the execution context.

In certain embodiments, the execution context transitions to an expired state upon satisfaction of an expiration condition defined by a time or session scope constraint bound to the execution context. Expiration may occur automatically upon reaching a defined temporal bound or upon completion of a workflow stage. Upon expiration, the governance control plane prevents further routing of proposed actions to the execution interface (160) for effectuation under the expired execution context and requires instantiation of a new execution context for continued operation.

In certain embodiments, the execution context transitions to a revoked state upon change in metadata (302), change in credential lineage, change in jurisdictional applicability, change in risk classification, change in purpose constraint, revocation of delegation authority, or update of an applicable policy artifact (304) version. Upon revocation, previously computed authorization outcomes, effective privilege sets (700), authorization artifacts (1200), or obligation states associated with the prior policy version are invalidated or recomputed. Subsequent proposed outputs or proposed actions require re evaluation under the updated metadata or policy artifact version.

For example, where bound metadata or an applicable policy artifact version changes, the governance control plane transitions the execution context to REVOKED, RESTRICTED, or SUSPENDED and invalidates or recomputes authorization outcomes, effective privilege sets, and authorization artifacts derived under prior conditions. Proposed actions associated with the prior conditions are blocked from effectuation through the execution interface unless revalidated under the currently applicable metadata and policy version.

In some configurations, the governance control plane monitors for changes in bound metadata or applicable policy artifacts and performs revalidation of the execution context when such changes are detected. Revalidation may include recomputation of effective privilege sets, reevaluation of active obligations, verification of authorization artifact validity, and confirmation that the execution context remains within permissible scope.

In particular implementations, termination of an execution context occurs upon explicit supervisory instruction, completion of a defined workflow, satisfaction of a terminal obligation condition, or system shutdown. Upon termination, the execution context is marked inactive and no further proposed outputs or proposed actions may be associated with that execution context.

Lifecycle transitions, including instantiation, restriction, suspension, escalation, expiration, revocation, revalidation, and termination, are recorded by the audit record module (150) in governed audit records appended to the audit record store (152). The record may include the execution context identifier, prior and subsequent lifecycle states, a triggering condition, a timestamp (1010), and the applicable policy identifier and version.

A revocation condition defined by an applicable policy artifact may trigger invalidation or recomputation of privileges, delegation authority, or authorization artifacts associated with the execution context. After revocation, routing of proposed actions to the execution interface (160) for effectuation under the revoked authority is blocked unless reevaluated under the currently applicable policy constraints. In embodiments employing cryptographic linkage, lifecycle transition records may be chained to prior governance records to preserve traceability and tamper evidence.

These lifecycle and invalidation semantics tie execution authority to current metadata, applicable policy versions, obligation state, and validation results, so that execution authority is dynamically constrained by current metadata, policy version, delegation validity, and obligation state at the time of routing to the execution interface.

Accordingly, execution context lifecycle state is evaluated as part of gating prior to dispatch to the execution interface, such that classification, policy evaluation, lifecycle validation, and effectuation occur within a unified governed execution sequence.

Delegation Governance

In environments involving multiple agents or reasoning components, the governance control plane governs delegation among agents operating under one or more execution contexts. Delegation may occur when a first agent or execution context assigns performance of a task, tool use, data access, workflow step, or action class to a second agent or execution context.

The governance control plane represents delegation events in a structured form referred to herein as a delegation chain. The delegation chain may be represented as a sequence or as a directed graph comprising nodes and edges. Nodes may correspond to agent identities, execution context identifiers, or task identifiers. Edges may correspond to delegation events linking a delegating execution context to a delegated execution context.

Each delegation event includes metadata describing the delegating execution context, the delegated execution context, the requested scope of authority, and one or more applicable policy artifacts identified by policy identifiers and versions. The requested scope may include tool permissions, data access permissions, workflow permissions, action classifications, or other authority attributes subject to policy constraint.

When delegation is proposed, the governance control plane validates delegation authority prior to permitting delegated execution to proceed. Validation includes determining whether the delegating execution context possesses sufficient delegation authority under applicable metadata and policy constraints. The governance control plane may compare credential lineage, role attributes, organizational affiliation, jurisdictional attributes, risk classification, purpose constraints, time or session scope constraints, and other metadata against delegation constraints defined in the applicable policy artifact.

In certain configurations, the governance control plane computes an effective privilege set for a delegated execution context. The effective privilege set defines the permissions granted to the delegated execution context after application of delegation constraints and privilege inheritance limitations.

The effective privilege set may be derived by applying inheritance limits to both (i) the requested delegation scope and (ii) the privilege scope of the delegating execution context.

In one implementation, the effective privilege set corresponds to an intersection of:

(a) privileges permitted to the delegating execution context, (b) privileges requested in the delegation event, and (c) privileges permitted under applicable policy for the delegated execution context.

In other implementations, the computed privilege scope may be further narrowed relative to the requested scope based on risk classification, purpose constraints, jurisdictional limits, temporal scope constraints, or other policy-defined conditions.

The governance control plane applies revocation conditions and time bounds to permissions associated with an execution context. Revocation state and expiration constraints are evaluated at effectuation time prior to permitting state advancement at a downstream acceptance endpoint. Privileges subject to revocation, expiration, superseding policy version, or invalidated delegation authority are excluded from the effective privilege set (700) before invocation is permitted.

Application of revocation propagates to prevent continued use of operations previously permitted under the delegated execution context. Revocation may be triggered by a change in metadata, a change in policy artifact version, expiration of a delegating execution context, generation of an omission event, or receipt of an explicit revocation instruction.

In some configurations, delegated authority is time-bounded by assigning an expiration condition to the effective privilege set. An expiration timestamp for the effective privilege set may be computed as a minimum of: (i) a policy-defined maximum delegation duration, (ii) an expiration condition associated with the delegating execution context, and (iii) an expiration condition associated with the delegated execution context. Upon expiration, the effective privilege set is invalidated and further effectuation under delegated authority is prevented unless revalidated under current policy constraints.

In certain embodiments, effective privilege sets are further constrained using capability metadata, including parameter-range caps defined by a tool descriptor (404). When capability metadata specifies permitted parameter bounds or scope constraints, those constraints are incorporated into the effective privilege set. The execution interface (160) enforces such constraints by rejecting, narrowing, or transforming proposed actions whose parameters exceed authorized limits, thereby preventing delegated authority from expanding beyond permitted operational bounds.

Updates to revocation state, expiration of effective privilege sets, and enforcement of parameter-range caps may be recorded in governed audit records to preserve traceability of delegation lifecycle and authority transitions.

The governance control plane enforces privilege inheritance limitations that prevent expansion of authority through delegation. A delegated execution context may not obtain permissions exceeding those authorized for the delegating execution context unless expressly permitted by the applicable policy artifact. Delegation validation and effective privilege computation occur prior to routing a delegated proposed action to the execution interface for effectuation.

Recursion detection and cycle detection are applied to the delegation chain to determine whether a repeated identifier indicates a recursive delegation or cycle. The governance control plane may examine identifiers associated with agents, execution contexts, tasks, or delegation events to determine whether a repeated identifier indicates a recursive delegation or a cycle within the delegation chain. Detection of recursion or a cycle may trigger denial of the proposed delegation, suspension of delegated execution, restriction of the effective privilege set, or escalation for supervisory review.

In some configurations, detection of recursion or a cycle in the delegation chain results in a mandatory enforcement response comprising denial, deferral, or escalation of the proposed delegation and may transition the associated execution context to a RESTRICTED or SUSPENDED state until supervisory resolution or policy-defined remediation occurs. Such enforcement actions are recorded in a governed audit record.

Escalation may also occur when delegation authority is insufficient, when the requested scope exceeds a defined threshold, when privilege inheritance limitations would be violated, or when risk or jurisdictional conditions require higher authority review. Escalation may route the proposed delegation to a supervisory process prior to permitting further execution under delegated authority.

In one implementation, delegation validation results and computed effective privilege sets are supplied to the policy constraint engine and to the execution interface so that runtime enforcement of delegated actions reflects the validated scope of authority. Actions proposed under delegated authority remain subject to policy evaluation, gating, and runtime enforcement prior to effectuation. Accordingly, delegated actions traverse the same canonical sequence of action classification, policy evaluation, gating, execution interface mediation, and governed audit recording as non-delegated actions.

Delegation validation results, effective privilege sets, and any denial, suspension, restriction, or escalation decisions may be recorded in a governed audit record. The governed audit record may include identifiers corresponding to the delegation chain and may be cryptographically linked to prior records in an audit record store.

Representing delegation as a structured chain and applying validation and privilege computation before routing delegated actions to the execution interface constrains multi-agent execution, limits privilege expansion, and preserves traceability across centralized and distributed deployments.

An execution context (300A) associated with a supervisory role may be authorized to invoke a workflow endpoint capable of modifying regulated records across multiple jurisdictions. A delegation event (630) may request that a subordinate execution context (300B) perform a subset of that task. Upon receipt of the delegation event, the governance control plane computes an effective privilege set (700) for execution context (300B) in accordance with the intersection logic and inheritance limits defined above. Privileges not present in all three sets are excluded, and revoked scopes, expired authorities, or prohibited capabilities are removed prior to authorization evaluation and prior to effectuation.

Where execution context (300A) is authorized to modify records across multiple jurisdictions but policy constrains execution context (300B) to a single jurisdiction, the effective privilege set is limited to the permitted jurisdiction before authorization evaluation. Where a revocation condition applies to a workflow capability or delegation authority, the revoked scope is removed from the effective privilege set before any delegated action is evaluated or routed to the execution interface (160).

Detection of a repeated execution context identifier within a delegation chain (600), or formation of a recursive loop, results in application of a policy-defined enforcement response comprising denial, deferral, or escalation of the delegation event. The associated execution context transitions to a RESTRICTED or SUSPENDED state in accordance with the applicable policy artifact. The execution interface (160) prevents effectuation of proposed actions dependent upon an invalid delegation chain. Delegation validation results, effective privilege computations, lifecycle transitions, and enforcement actions are recorded in governed audit records.

Obligation Monitoring and Omission Detection

The governance control plane enforces policy-defined obligations associated with an execution context. An obligation represents a required condition or required step that must occur under defined policy constraints. Obligations may arise from evaluation of a proposed output or proposed action, from characteristics of an execution context, from delegation events, from authorization outcomes, from generation of a scope disclosure artifact, or from predefined workflow requirements.

Obligations are represented as obligation objects associated with an execution context. An obligation object includes at least an obligation identifier, a required event type, a start condition, and a time window having an expiration condition. An obligation object may further include metadata identifying the applicable policy artifact and version, remediation conditions, enforcement parameters, escalation conditions, and references to related authorization outcomes or delegation events.

In certain embodiments, the obligation object (800) is represented as a structured data object comprising fields including: obligation_id, execution_context_id, required_event_type, start_condition, start_timestamp when activated, expiration_timestamp, current_state, policy_identifier, policy_version, and one or more enforcement parameters. In some configurations, the obligation object (800) further includes a satisfaction predicate, a waiver condition identifier, a remediation condition identifier, or a correlation identifier used to associate normalized events in the normalized event stream (910) with the obligation object (800).

In certain embodiments, an obligation object (800) is evaluated as a deterministic state machine maintained by the obligation monitoring module (180). For example, an obligation object may transition among states including CREATED, ACTIVE, SATISFIED, EXPIRED, WAIVED, or REMEDIATED.

The obligation object transitions from CREATED to ACTIVE upon satisfaction of a defined start condition. The start condition may comprise receipt of a triggering event, issuance of an authorization outcome, creation of a delegation event, association of a scope disclosure artifact, or another policy-defined trigger. While in the ACTIVE state, the obligation monitoring module evaluates the normalized event stream (910) to determine whether a required event satisfying a defined satisfaction predicate has occurred within the associated time window.

The obligation object transitions from ACTIVE to SATISFIED upon detection of a required event that satisfies the satisfaction predicate. The obligation object transitions from ACTIVE to EXPIRED when, at expiration of the defined time window, the required event is absent from the normalized event stream (910). Upon transition to EXPIRED, the governance control plane generates an omission event (1002) and applies a policy-defined response.

Omission detection is implemented as a deterministic control evaluation rather than as retrospective monitoring. The governance control plane performs an absence determination against structured, normalized event evidence relative to a stored expiration condition and, upon detecting expiration without satisfaction, automatically generates an omission event that serves as a gating control input to runtime enforcement. Omission therefore operates as an execution control mechanism that conditions dispatch and effectuation through the execution interface rather than as a post hoc compliance record.

Transition to a WAIVED state occurs pursuant to an explicit policy-defined waiver condition validated by the governance control plane. Validation may include confirmation of applicable authority and verification of the associated policy identifier and version.

Where an omission event has been generated, subsequent corrective actions are treated as remediation events. Transition of the obligation object to REMEDIATED may occur only when the applicable policy artifact expressly permits reversible omission semantics.

State transitions are recorded in governed audit records, thereby enabling reconstruction of obligation lifecycle and enforcement actions independent of model output.

The governance control plane receives events generated by system components including the supervisory orchestration layer, the policy constraint engine, the execution interface, tools, workflow engines, devices, downstream services, or other computing nodes. Events may include acknowledgments, approvals, confirmations, reassessments, logging events, signal presence events, tool invocation events, enforcement actions, authorization artifact validations, scope disclosure artifact associations, or other governance-relevant occurrences.

Events are transformed into a normalized event stream using a consistent schema. The normalized event stream includes, for each event, at least an event type, a timestamp, and an associated execution context identifier. The normalized event stream may be maintained in memory, in an append-only log, within an event processing system, or within a distributed event infrastructure. In distributed embodiments, normalized events originating from multiple nodes may be consolidated or reconciled prior to obligation evaluation.

In certain implementations, the normalized event stream (910) may be implemented as an append-only event log, an event bus, a distributed stream-processing topic, an event table, or another ordered event collection maintained within a messaging system, stream processing infrastructure, or event storage system capable of preserving event ordering and supporting deterministic obligation evaluation.

Events are normalized into a canonical event schema and stored in a normalized event stream 910. Each normalized event is represented as a structured record that includes a unique event identifier, a canonical event type label, an event time expressed within a defined clock domain and used for obligation satisfaction evaluation independent of ingest time. The normalized event further includes a source identifier, an execution context identifier used for correlation, an actor identifier or role identifier associated with the event, and, where applicable, a tool identifier or endpoint identifier. Cross event correlation is supported through a request identifier or correlation identifier, and event ordering is supported through a sequence token or monotonic counter. The normalized event may also include an integrity value derived from a cryptographic transformation and associated signature metadata, a payload schema version indicating the canonical schema applied, and a structured payload containing fields relevant to obligation evaluation.

Normalization may include elimination of duplicate events, ordering based on event time subject to a policy-defined tolerance for clock drift, and rejection or marking of events whose integrity values fail validation.

The governance control plane evaluates active obligation objects against the normalized event stream. For each obligation object, the governance control plane determines whether a required event corresponding to the obligation identifier occurs prior to expiration of the associated time window. Evaluation may be triggered upon receipt of relevant events, upon expiration of a time window, upon attempted effectuation of a proposed action, or according to a periodic evaluation process.

Omission detection is implemented as a deterministic evaluation condition. For each obligation object (800), if the required event is absent from the normalized event stream (910) at expiration of the associated time window, the governance control plane generates a corresponding omission event (1002). The omission event includes at least the obligation identifier, the execution context identifier, the applicable policy identifier and version, and a timestamp corresponding to the expiration condition.

Omission detection may occur automatically without requiring human intervention. The omission event may be inserted into the normalized event stream and may itself be subject to policy evaluation, gating logic, and audit recording.

Upon generation of an omission event, the governance control plane applies a policy-defined response. The policy-defined response may include suspension of execution associated with the execution context, reduction of autonomy, restriction of the effective privilege set, escalation to supervisory review, notification to designated roles, blocking of further proposed actions, withholding of dispatch of downstream invocations, revocation of delegation authority, or invocation of a remediation workflow.

In some configurations, the execution interface enforces omission related restrictions by preventing effectuation of proposed actions while an obligation remains unsatisfied. Effectuation of actions associated with an execution context may be gated until satisfaction of required events or completion of remediation steps. The governance control plane may maintain state information indicating whether an execution context is suspended, restricted, escalated, or otherwise constrained due to an active omission condition.

In some embodiments, absence of a required signal source, data channel, contextual input, authorization artifact, or scope disclosure artifact within the defined time window results in the required event being absent from the normalized event stream (910) for the associated obligation object (800), thereby triggering generation of an omission event (1002). For example, if policy requires confirmation of receipt of specified data, acknowledgment from a defined role, supervisory approval, or association of a scope disclosure artifact prior to effectuation, absence of such confirmation prior to expiration results in generation of an omission event and enforcement of a policy-defined response.

The governance control plane records obligation creation, satisfaction, expiration, omission events, and applied policy-defined responses in governed audit records. Governed audit records may include the obligation identifier, time window parameters, timestamps of evaluation, omission detection results, enforcement actions taken, and identifiers corresponding to related delegation events or authorization outcomes. In embodiments employing cryptographic linkage of audit records, omission related records may be cryptographically linked to prior governance records to preserve traceability and tamper evidence.

By representing obligations as obligation objects (800), evaluating those obligation objects against a normalized event stream (910), and generating omission events (1002) when required events are absent at expiration, the governance control plane enforces completion of required steps prior to effectuation through the execution interface (160).

Deterministic Omission Window Semantics

In particular implementations, omission detection is implemented using deterministic temporal window semantics defined at creation of an obligation object (800). The obligation object specifies a start condition, a time window, and an expiration condition in a manner that permits reproducible evaluation independent of subjective interpretation.

The start condition for an obligation object may be defined as occurrence of a specified triggering event, generation of an authorization outcome (422), creation of the obligation object by the policy constraint engine (130), completion of a delegation event (630), association of a scope disclosure artifact (1250), receipt of a required data source, or another explicitly defined governance event. The governance control plane records the timestamp (1010) corresponding to the start condition and computes the expiration condition deterministically as a function of the recorded start time and a policy-defined temporal interval or absolute expiration parameter.

The time window is therefore anchored to a recorded start timestamp and an explicit expiration timestamp derived therefrom. In certain embodiments, the time window is deterministically defined in that both the start condition and the expiration condition are computed according to predefined policy rules such that identical triggering events under identical policy artifacts produce identical temporal boundaries for obligation evaluation.

The expiration timestamp is computed using a defined time standard maintained by the governance control plane, including a coordinated universal time (UTC) reference, a synchronized distributed clock, or a logical clock domain defined by policy, and is stored in association with the obligation object (800).

Evaluation of omission is performed by comparing normalized event stream (910) entries against the stored expiration timestamp using a consistent temporal reference.

In some configurations, the governance control plane applies an event time watermark or finalization marker for obligation evaluation. The watermark represents a deterministically computed temporal boundary after which events with timestamps earlier than the expiration timestamp are no longer considered timely for purposes of satisfying the obligation. The watermark may be defined as the expiration timestamp itself or as the expiration timestamp plus a policy-defined tolerance interval for distributed system latency.

When the expiration timestamp associated with the obligation object (800) is reached and the required event is absent from the normalized event stream (910), the governance control plane generates an omission event (1002). In one implementation, once an omission event (1002) is generated and recorded, subsequent late arrival of a required event does not retroactively negate the omission event. Instead, the late event may be recorded separately and may trigger a remediation workflow or policy-defined response distinct from initial satisfaction of the obligation.

In certain embodiments, evaluation of required events is performed using event time semantics rather than processing time semantics. Each normalized event includes a timestamp corresponding to its occurrence, and omission detection compares event occurrence time to the expiration timestamp rather than to the time of event processing. This approach reduces nondeterminism arising from network latency, buffering, or distributed event propagation delays.

In distributed embodiments, the governance control plane may reconcile events from multiple nodes prior to finalizing omission detection. Reconciliation may include validation of event timestamps, ordering of events according to recorded timestamps, and application of defined clock synchronization tolerances. The omission determination is made using the reconciled normalized event stream and the stored expiration timestamp.

Upon generation of an omission event (1002), the omission state is considered final for that obligation object (800) unless a policy artifact (304) expressly defines reversible omission semantics. Any remediation or corrective action occurs as a new governance event and is recorded in a subsequent governed audit record rather than altering the historical omission determination.

Lifecycle state of the associated execution context (300) may be updated upon omission detection, including transition to restricted, suspended, escalated, or revoked states. Such state transitions are governed by policy-defined response logic and are recorded in governed audit records appended to the audit record store (152).

Anchoring omission detection to explicit start conditions, computed expiration timestamps, watermark finality, and event-time comparison makes omission evaluation reproducible and auditably time-bound rather than discretionary.

In particular implementations, a policy artifact (304) requires receipt of a SCOPE_ACK event within ten minutes following issuance of an authorization outcome (422) for a proposed action classified as EXPORT_OR_DISCLOSE_REGULATED_DATA. Upon generation of the authorization outcome, the governance control plane records a start timestamp (1010) and deterministically computes an expiration timestamp defining a window [t_start, t_expire].

An obligation object (800) is instantiated in an ACTIVE state and associated with the execution context (300). The obligation monitoring module evaluates the normalized event stream (910) to determine whether a SCOPE_ACK event corresponding to the same execution context identifier is present with an event_time less than or equal to t_expire. Evaluation is performed using event-time semantics rather than ingest-time semantics.

If a watermark associated with the normalized event stream indicates that no additional events having event_time less than or equal to t_expire are expected, and no qualifying SCOPE_ACK event has been observed, the obligation object transitions to EXPIRED and the governance control plane generates an omission event (1002). In response, the execution interface (160) prevents effectuation of the associated proposed action (420), and a governed audit record (222) is appended reflecting the omission determination and enforcement action.

If a SCOPE_ACK event arrives after watermark-based finalization, the event is treated as a late event. The late event does not retroactively negate the omission event unless expressly permitted by the applicable policy artifact (304). Where remediation is permitted under policy-defined conditions, the obligation object may transition to REMEDIATED and the execution context (300) may be restored to an active state following re-evaluation under current policy constraints. All state transitions and late-event handling outcomes are recorded in governed audit records.

Governance Records and Traceability

The governance control plane appends governed audit records that capture governance-relevant information for execution contexts and associated policy state. A governed audit record is generated in response to one or more governance events, including evaluation of a proposed output or proposed action, generation of an authorization outcome, application of runtime enforcement, validation of delegation, computation of an effective privilege set, creation or satisfaction of an obligation object, detection of an omission event, issuance or validation of an authorization artifact, and generation or association of a scope disclosure artifact.

In certain embodiments, a governed audit record includes the resolved action classification (410) and an identifier of any tool descriptor (404), schema, mapping rule set, or classification logic version used to determine the action classification. The governed audit record may further include a classification resolution indicator when multiple candidate classes were evaluated and resolved deterministically. Inclusion of such information enables reconstruction of the action class evaluated, the policy constraints selected, and the enforcement controls applied at the time of gating and effectuation.

Each governed audit record includes at least an execution context identifier, a policy identifier and version corresponding to the applicable policy artifact, and an indication of the governance decision applied. The governed audit record may further include an action classification, an authorization outcome, enforcement parameters, gating decisions, delegation validation results, identifiers associated with a delegation chain, a computed effective privilege set when applicable, obligation identifiers and time window parameters, omission events, references to authorization artifacts, references to scope disclosure artifacts, timestamps, and other metadata sufficient to reconstruct the governance state at the time of evaluation or effectuation.

Governed audit records are appended to an audit record store. In some configurations, the audit record store is implemented as an append-only structure in which prior records are not overwritten. The audit record store may be implemented using a database, log, ledger, object store, distributed storage system, or other persistent storage mechanism.

Successive governed audit records may be cryptographically linked to enable detection of modification to prior records. Linkage may be implemented by incorporating into a later governed audit record a cryptographic hash, digest, signature, message authentication code, or other integrity value derived from at least one prior governed audit record.

Incorporation of a prior integrity value establishes a chained relationship between records. Modification of a prior record alters the derived integrity value and produces a detectable inconsistency within the linkage sequence.

The cryptographic mechanism used to compute the integrity value is not limited to a particular algorithm and may vary according to system configuration, policy requirements, or applicable regulatory constraints.

In distributed embodiments, governed audit records generated at multiple computing nodes may be transmitted, consolidated, reconciled, or validated across nodes. Prior to acceptance of a governed audit record into a receiving audit record store, the receiving node validates integrity values and cryptographic linkage associated with the record. If integrity validation, linkage verification, or required metadata consistency checks fail, the receiving node rejects the record, records a validation failure event in its local audit record store, and may trigger a policy-defined response. In certain implementations, records maintained at separate nodes are reconciled using identifier matching and cryptographic linkage verification to preserve traceable governance continuity across system boundaries.

The governed audit records enable reconstruction of governance decisions and execution conditions independently of model output. Because the records capture execution context identifiers, applied policy identifiers and versions, authorization outcomes, enforcement actions, delegation validation results, obligation states, omission events, and associated artifacts, a reviewer may determine what authority was applied, what constraints were enforced, what required conditions were satisfied or unsatisfied, and what runtime controls were exercised prior to effectuation.

Append-only, tamper-evident governance records linked to execution contexts and policy artifacts support traceability for compliance analysis, regulatory review, supervisory oversight, forensic investigation, dispute resolution, or litigation. Such traceability may be established without reliance on the internal reasoning processes of a model.

Scope Disclosure and Data Source Visibility

In certain embodiments, the governance control plane tracks information regarding data sources, contextual inputs, and signal streams supplied to a reasoning engine within an execution context. Such tracking is performed under applicable policy constraints and may be used to generate a structured representation referred to herein as a scope disclosure artifact.

The scope disclosure artifact identifies at least one of data sources reviewed, contextual inputs supplied as governed context, data sources declared unavailable, data sources excluded by policy constraints, signal streams not observed within a defined interval, detected conflicts between available data sources, or policy constraints that limited access to particular data sources. The scope disclosure artifact may further identify execution context identifiers, timestamps associated with data retrieval or observation, and policy identifiers and versions applicable at the time of evaluation.

Generation of the scope disclosure artifact may occur prior to delivery of a proposed output or prior to effectuation of a proposed action. In one implementation, delivery or effectuation is gated until the scope disclosure artifact is generated and associated with the proposed output or proposed action. In such embodiments, the governance control plane conditions runtime enforcement on presence of the scope disclosure artifact when required by applicable policy constraints.

The scope disclosure artifact may be associated with a proposed output in a user interface, appended to a governed audit record, transmitted alongside an authorization artifact, transmitted to a downstream service, or stored for subsequent review. In distributed embodiments, a scope disclosure artifact generated at one node may be validated or referenced at another node prior to permitting effectuation.

In some embodiments, the governance control plane compares data sources required under applicable policy constraints against the governed context actually supplied to the reasoning engine. When a required data source is unavailable, excluded, restricted by policy, or not observed within a defined interval, the scope disclosure artifact reflects such absence. The governance control plane may treat absence of required data sources as a condition influencing policy evaluation, authorization outcomes, gating decisions, delegation constraints, or creation of an obligation object.

The scope disclosure artifact may also identify conflicts detected between multiple data sources, including inconsistent values, timestamp discrepancies, incomplete confirmations, or unresolved discrepancies. Detection of unresolved conflicts may influence authorization outcomes or may result in a policy-defined response, including deferral of effectuation, escalation for supervisory review, generation of an obligation requiring confirmation, or restriction of permitted action scope.

In certain embodiments, absence of a required data source or unresolved conflict reflected in the scope disclosure artifact may be evaluated under omission monitoring logic when policy defines such absence as a required event failure.

A structured scope disclosure artifact may be associated with proposed outputs and proposed actions to provide visibility into the contextual basis for execution. The artifact may enable reconstruction of information considered, information unavailable or excluded, and policy-imposed limitations at the time of evaluation. Such traceability may support informed reliance, supervisory oversight, compliance analysis, or dispute resolution.

Authorization Artifact and Cross Node Validation

In certain embodiments, the governance control plane generates an authorization artifact representing the result of policy evaluation for a proposed output or proposed action. The authorization artifact is a structured representation of the authorization outcome and the scope and conditions under which delivery or effectuation is permitted. The authorization artifact may be generated when the authorization outcome is allow, modify, or defer, and may also be generated in other authorization states when policy requires structured documentation of evaluation results.

The authorization artifact includes structured fields comprising at least an execution context identifier, a policy identifier and version corresponding to the applied policy artifact, a permitted scope definition, and a time window or expiration condition. The authorization artifact may further include constraint parameters associated with the authorization outcome, identifiers corresponding to a tool descriptor, an action classification, a delegation chain identifier, a computed effective privilege set, references to one or more obligation objects, and references to a scope disclosure artifact when required under applicable policy constraints.

The authorization artifact may include an integrity value suitable for validation, including a cryptographic hash, signature, message authentication code, or other integrity mechanism. The particular integrity mechanism is not limited to a specific algorithm unless required by policy or regulatory constraints.

The authorization artifact may be stored in association with the execution context, appended to a governed audit record, transmitted to an execution interface, or transmitted to a receiving node in a distributed computing environment. In particular implementations, the authorization artifact accompanies or references a scope disclosure artifact such that downstream systems may verify both authorization scope and contextual disclosure requirements prior to effectuation.

In implementations involving distributed or cross system workflows, a first governance control plane operating at a first node may generate an authorization artifact and transmit the artifact to a second node. The second node may include a governance control plane or execution interface configured to require validation of the authorization artifact prior to permitting effectuation of a proposed action.

Validation at the receiving node may include verifying integrity of the authorization artifact using a cryptographic mechanism, confirming that the policy identifier and version are recognized or acceptable under locally applicable policy constraints, confirming that the authorization artifact has not expired, verifying that the permitted scope definition aligns with the proposed action to be effectuated, verifying that the execution context identifier corresponds to a recognized or authorized context, and confirming that any referenced scope disclosure artifact or required obligation state is present and valid when required by policy.

If validation at the receiving node fails, the receiving node may deny effectuation, defer effectuation, restrict permitted scope, generate an omission event when applicable, or escalate for supervisory review in accordance with local policy constraints. If validation succeeds, the receiving node may permit effectuation within the permitted scope defined by the authorization artifact and applicable local constraints.

In some configurations, validation at the receiving node may be implemented in a fail-closed manner. Effectuation may occur only after successful verification of integrity, expiration status, execution context consistency, and permitted scope alignment. Absence of a valid authorization artifact, failure of integrity verification, expiration of the artifact, mismatch of execution context identifier, or inconsistency between the permitted scope and the proposed action may result in denial or deferral of effectuation in accordance with local policy. Validation outcomes may be recorded as governance events in governed audit records.

In some configurations, the authorization artifact comprises structured fields including at least an execution context identifier, a policy identifier and version, a permitted scope definition, a time window or expiration parameter, and an integrity value. The integrity value may comprise a cryptographic hash, digital signature, or message authentication code generated by the originating governance control plane. A receiving node validates the authorization artifact by verifying integrity, confirming consistency of the policy identifier and version with locally applicable policy artifacts, confirming that the permitted scope aligns with locally enforceable constraints, and confirming that the authorization artifact has not expired prior to permitting effectuation. If validation fails, effectuation is denied, deferred, or escalated according to local policy.

In one implementation, the execution interface at a receiving node requires presentation of a valid authorization artifact prior to invoking a tool, application programming interface, workflow engine, device, or downstream service. Absence of a valid authorization artifact, expiration of the artifact, mismatch of scope, invalid integrity verification, or failure of required scope disclosure conditions may result in denial or deferral of effectuation.

Generation, transmission, validation, acceptance, restriction, deferral, denial, or expiration of authorization artifacts may be recorded in governed audit records. Such records may include identifiers corresponding to originating and receiving nodes, execution context identifiers, policy identifiers and versions, timestamps, validation outcomes, and enforcement actions. In distributed embodiments, governed audit records associated with authorization artifacts may be cryptographically linked to preserve traceability across nodes.

Representing authorization outcomes as structured authorization artifacts and validating those artifacts across nodes prior to delivery or effectuation supports governance continuity in distributed environments by requiring integrity verification, expiration validation, and scope consistency checks before permitting effectuation. Cross-node validation enforces policy-bound execution scope across institutional or system boundaries by rejecting or deferring effectuation when artifact integrity, scope alignment, or policy identifier verification fails, thereby limiting unauthorized expansion of authority during distributed interactions.

Integrated Runtime Governance Architecture

The governance control plane operates as a runtime governance architecture centered on mediation of external operations through a fail-closed execution interface.

Execution-context-bound policy evaluation and machine-computed action classification determine authorization artifacts governing effectuation, while delegation lineage evaluation and omission-event generation operate within the same mediated execution control path.

Authorization evaluation, delegation validation, and obligation monitoring operate within this mediated runtime control path and determine whether external operations are permitted to proceed.

Although certain components may employ permissions, policy constraints, or privilege representations, the disclosed system is not limited to role based access control, attribute based access control, or static authorization mapping. The runtime control operations described herein depend on machine-executed computation of action classifications, evaluation of normalized event streams, cryptographic artifact validation, and mediation of external capability invocation through an execution interface, and are therefore not practically performable in the human mind.

In certain computing systems, authorization decisions are determined using static permission assignments in which permissions are associated with roles or attributes and evaluated against an identity at the time of access. Such systems typically evaluate access conditions independently of delegation lineage, obligation state, or runtime mediation of external effectuation.

The governance control plane described herein evaluates proposed outputs and proposed actions within an execution context that incorporates policy artifact versioning, action classification, delegation lineage validation, and obligation state. Authorization outcomes are derived from structured evaluation of execution context metadata, applicable policy artifacts, and operational attributes of the proposed action. As a result, authorization evaluation reflects the current execution context state, policy version, validated delegation scope, and obligation status at the time of gating and runtime enforcement.

The governance control plane computes an effective privilege set dynamically for each delegated execution context based on a structured delegation chain, inheritance limitations defined in a versioned policy artifact, requested scope parameters, execution context metadata, and applicable risk or jurisdictional constraints. The effective privilege set may be narrowed relative to both the delegating execution context and the requested scope, and may be further restricted based on temporal constraints, obligation state, omission state, or policy-defined responses. The resulting privilege set represents a computed privilege boundary derived from structured evaluation conditions associated with the execution context and applicable policy artifacts.

Authorization outcomes in the disclosed system govern runtime enforcement rather than solely determining logical access permissions. Authorization outcomes are enforced at runtime through mediation by an execution interface that structurally separates reasoning from effectuation. Proposed actions are not considered complete upon authorization evaluation; rather, effectuation authority is mediated, credential isolated, and route restricted such that external capabilities cannot be invoked without compliance with current execution context state, policy artifact version, effective privilege set, and artifact validation requirements.

Obligation monitoring is not implemented as a passive timeout or workflow reminder. Instead, omission detection is performed as a deterministic computation of absence within a defined time window, evaluated against a normalized event stream with defined start conditions, expiration conditions, and watermark handling. Detection of omission triggers policy-defined responses that may suspend execution contexts, restrict effective privilege sets, block effectuation at the execution interface, or escalate prior to permitting further operational actions. Omission is therefore treated as a computed governance state tied to runtime enforcement, not merely a background monitoring function.

Governed audit records are not limited to logging events after execution. Each governed audit record captures execution context identifiers, policy artifact identifiers and versions, action classifications, authorization outcomes, delegation validation results, effective privilege computations, obligation states, omission events, and artifact identifiers. In certain embodiments, governed audit records are cryptographically linked such that modification of prior records is detectable. Audit recording is therefore integrated into the governance control mechanism rather than operating as an independent logging subsystem.

In distributed embodiments, authorization artifacts and scope disclosure artifacts generated at one node must be validated at a receiving node prior to permitting effectuation. Validation includes integrity verification, scope alignment, expiration validation, and policy consistency checks. Effectuation is denied in the absence of successful artifact validation even if a prior node authorized the action. This cross node continuity further distinguishes the disclosed system from static access control models that evaluate permissions only at a single enforcement point.

The governance control plane governs execution by mediating effectuation of external capabilities through the execution interface. Within this mediated runtime control path, the system applies execution context binding, policy artifact versioning, deterministic action classification, delegation lineage evaluation, dynamic effective privilege computation, and omission detection.

In certain embodiments, action classification computation precedes policy evaluation and gating, and the resulting classification serves as a control input used by the policy constraint engine to select applicable policy constraints and enforcement parameters. By computing action classification from structured operational attributes of a proposed action and capability metadata rather than from semantic interpretation of generated content, the governance control plane enables deterministic selection of policy constraints and enforcement behavior based on operational characteristics of the proposed action. This classification mechanism enables consistent action classification and corresponding authorization evaluation for identical structured inputs evaluated under the same policy artifact version.

The architecture further incorporates sole-egress runtime mediation, artifact validation, and cryptographically linked audit recording applied prior to delivery or effectuation.

The disclosed governance control plane does not merely place orchestration, authorization, event monitoring, and audit recording as independent subsystems. Instead, these mechanisms operate as a coordinated runtime control sequence in which machine-computed action classification, policy-constrained evaluation under an execution context, mediation of effectuation through an execution interface, delegation-chain privilege validation, deterministic omission-event generation from a normalized event stream, and authorization artifact validation collectively determine whether external operations are permitted to proceed. By coupling these mechanisms within a single runtime governance path prior to effectuation, the system enforces operational constraints that are not achieved by separate orchestration, access-control, workflow, or logging components operating independently.

These mechanisms operate together to constrain execution behavior at runtime and across distributed system boundaries by mediating effectuation through the execution interface, validating artifacts, and generating omission-triggered enforcement responses. Static access control systems, standalone policy constraint engines, workflow timeout mechanisms, and independent audit logging subsystems may implement individual control functions but do not provide the integrated governance control plane architecture described herein.

DETAILED DESCRIPTION OF THE FIGURES

FIG. 1 High-Level Governance Control Plane Architecture

FIG. 1 is a block diagram illustrating an example architecture of a governance control plane 100 that controls execution of artificial intelligence agents within a regulated computing environment.

The governance control plane (100) includes one or more processors and memory (110) storing executable instructions that implement the control functions described herein.

The governance control plane (100) includes an execution context manager (120) configured to instantiate and maintain an agent execution context (300). The agent execution context (300) is bound to metadata (302) and associated with one or more policy artifacts (304) selected based on the metadata.

In certain embodiments, the governance control plane 100 includes a session memory governance module 122 that controls retention and reuse of contextual information associated with the agent execution context 300.

The governance control plane (100) further includes a supervisory orchestration layer (140) configured to route governed context associated with the agent execution context (300) to one or more reasoning engines and to receive proposed outputs or proposed actions generated thereby.

The supervisory orchestration layer (140) routes governed context to one or more reasoning engines (1300), each reasoning engine (1300) generating a proposed output or proposed action in response to the governed context and returning the proposed output or proposed action to the supervisory orchestration layer (140) for evaluation by the policy constraint engine prior to any dispatch or execution.

A policy constraint engine (130) evaluates proposed outputs and proposed actions under applicable policy artifacts (304) and produces an authorization outcome (422).

Proposed actions that would result in effectuation are routed to an execution interface (160). The execution interface (160) mediates interaction with external capabilities (190), including service interfaces or inter-service interfaces, which may include tools, application programming interfaces, workflow engines, devices, or downstream services. The execution interface (160) enforces the authorization outcome (422) at runtime prior to effectuation.

The governance control plane (100) may further include a delegation validation module (170) configured to evaluate a delegation chain (600) and compute an effective privilege set (700) when delegation among agents occurs.

An obligation monitoring module (180) maintains one or more obligation objects (800) and evaluates a normalized event stream (910) to detect omission events (1002) when required events are absent within defined time windows.

An audit record module (150) generates governed audit records and appends them to an audit record store (152). In some configurations, records stored in the audit record store (152) are cryptographically linked.

The components illustrated in FIG. 1 may reside within a single computing node or be distributed across multiple nodes. The figure depicts logical relationships and control boundaries and is not limited to any particular hardware arrangement.

REFERENCE LIST

100—GOVERNANCE CONTROL PLANE
110—PROCESSORS AND MEMORY
120—EXECUTION CONTEXT MANAGER
122—SESSION MEMORY GOVERNANCE MODULE
130—POLICY CONSTRAINT ENGINE
140—SUPERVISORY ORCHESTRATION LAYER
150—AUDIT RECORD MODULE
152—AUDIT RECORD STORE
160—EXECUTION INTERFACE
170—DELEGATION VALIDATION MODULE
180—OBLIGATION MONITORING MODULE

190—EXTERNAL CAPABILITIES
300—AGENT EXECUTION CONTEXT
302—METADATA
304—POLICY ARTIFACT
422—AUTHORIZATION OUTCOME
600—DELEGATION CHAIN
700—EFFECTIVE PRIVILEGE SET
800—OBLIGATION OBJECT
910—NORMALIZED EVENT STREAM
1002—OMISSION EVENT
1300—REASONING ENGINE

Figure 2:
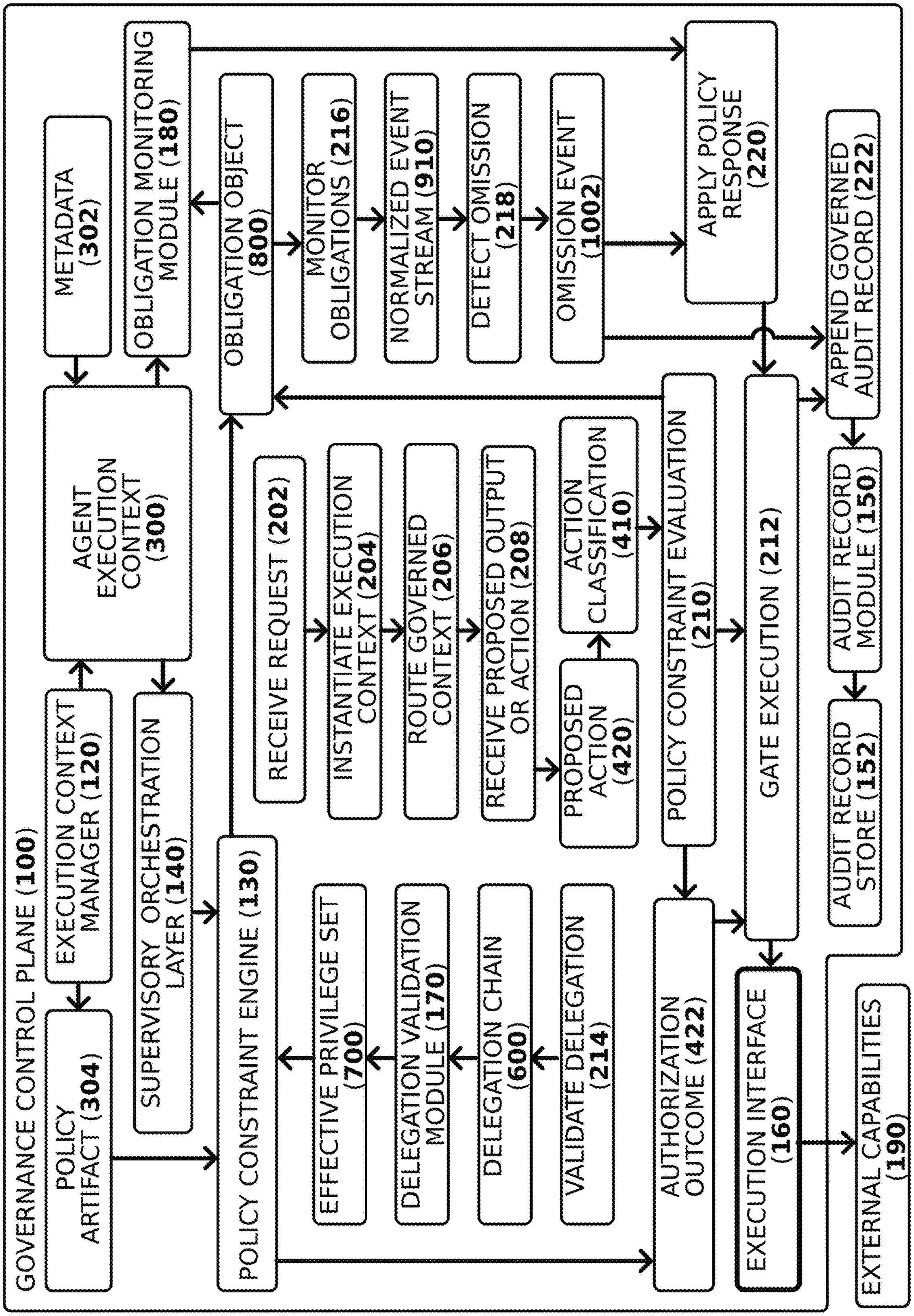
FIG. 2 is a flow diagram illustrating an example control flow for governed execution, including receiving a request, instantiating an execution context, computing an action classification for a proposed output or proposed action, routing governed context to one or more reasoning engines, evaluating proposals under applicable policy constraints, gating execution prior to delivery or effectuation, and recording governance-relevant outcomes.

FIG. 2 Canonical Governed Execution Control Flow

FIG. 2 is a flow diagram illustrating a governed execution sequence in which authorization for external operations is determined through machine-computed action classification and execution-context-bound policy evaluation prior to mediated effectuation through the execution interface (160).

The sequence includes request reception, execution context instantiation, deterministic action classification, policy evaluation, runtime gating, obligation monitoring against a normalized event stream, omission detection, application of policy-defined responses, and governed audit recording.

At step (202), the governance control plane (100) receives a request comprising one or more inputs. The request may originate from a user, another system, a workflow, or availability of new information.

At step (204), the execution context manager (120) instantiates an agent execution context (300) bound to metadata (302). The governance control plane selects at least one policy artifact (304) applicable to the execution context.

At step (206), the supervisory orchestration layer (140) routes governed context associated with the execution context (300) to one or more reasoning engines.

At step (208), the supervisory orchestration layer (140) receives a proposed output or proposed action (420) generated by one or more reasoning engines and computes an action classification (410) by applying a deterministic classification process to structured attributes of the proposed output or proposed action, including referenced tool identifiers, parameter schemas, operation types, or resource scopes.

The policy constraint evaluation (210) corresponds to policy evaluation performed by the policy constraint engine (130) under the selected policy artifact (304) and execution context (300).

The action classification (410) is determined prior to policy evaluation and serves as a structural control input to the policy constraint engine (130), such that policy evaluation at step (210) is performed relative to the resolved action classification.

At step (210), the policy constraint engine (130) evaluates the proposed output or proposed action (420) under the selected policy artifact (304) and generates an authorization outcome (422).

At step (212), the governance control plane gates dispatch or effectuation based on the authorization outcome (422), including preventing forwarding to the execution interface (160) or preventing invocation of an external capability (190).

If the proposed output or proposed action (420) involves effectuation of an external capability, the proposed action (420) is routed to the execution interface (160), which enforces the authorization outcome at runtime prior to effectuation of interaction with external capabilities (190), including service interfaces or inter-service interfaces.

In parallel or responsive to agent activity, at step (214), the delegation validation module (170) validates any delegation event by evaluating a delegation chain (600) and computing an effective privilege set (700) when applicable.

At step (216), the obligation monitoring module (180) maintains one or more obligation objects (800) associated with the execution context and monitors a normalized event stream (910) for required events.

At step (218), if a required event specified by an obligation object (800) is absent from the normalized event stream (910) at expiration of the corresponding time window, the obligation monitoring module (180) generates an omission event (1002).

At step (220), upon detection of an omission event (1002) or upon a deny, defer, or escalate authorization outcome (422), the governance control plane applies a policy-defined response that gates dispatch or effectuation through the execution interface (160), including suspension, deferral, escalation, modification, or blocking of invocation of an external capability (190).

At step (222), the audit record module (150) generates and appends a governed audit record to the audit record store (152), capturing at least the policy identifier and version, the authorization outcome, gating decisions, delegation validation results, and any omission event.

Steps (214), (216), and (222) may execute continuously or asynchronously relative to steps (206) through (212). FIG. 2 depicts a logical control sequence rather than a strictly serial process, except where sequencing is imposed by applicable policy constraints.

REFERENCE LIST

100—GOVERNANCE CONTROL PLANE
120—EXECUTION CONTEXT MANAGER
130—POLICY CONSTRAINT ENGINE
140—SUPERVISORY ORCHESTRATION LAYER
150—AUDIT RECORD MODULE
152—AUDIT RECORD STORE
160—EXECUTION INTERFACE
170—DELEGATION VALIDATION MODULE
180—OBLIGATION MONITORING MODULE
190—EXTERNAL CAPABILITIES
300—AGENT EXECUTION CONTEXT
302—METADATA
304—POLICY ARTIFACT
410—ACTION CLASSIFICATION
420—PROPOSED ACTION
422—AUTHORIZATION OUTCOME
600—DELEGATION CHAIN
700—EFFECTIVE PRIVILEGE SET
800—OBLIGATION OBJECT
910—NORMALIZED EVENT STREAM
1002—OMISSION EVENT
202—RECEIVE REQUEST
204—INSTANTIATE EXECUTION CONTEXT
206—ROUTE GOVERNED CONTEXT
208—RECEIVE PROPOSED OUTPUT OR ACTION
210—POLICY CONSTRAINT EVALUATION
212—GATE EXECUTION
214—VALIDATE DELEGATION
216—MONITOR OBLIGATIONS
218—DETECT OMISSION
220—APPLY POLICY RESPONSE
222—APPEND GOVERNED AUDIT RECORD

Figure 3:
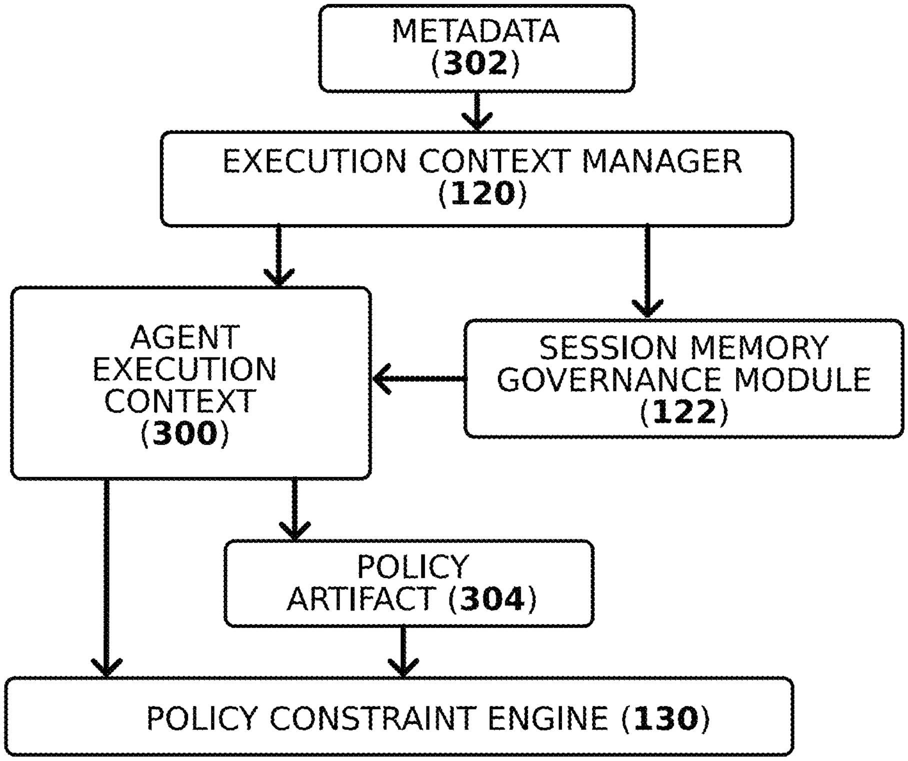
FIG. 3 is a diagram illustrating construction of an agent execution context and association of metadata and one or more policy artifacts for subsequent policy evaluation and enforcement.

FIG. 3 Execution Context Construction and Policy Binding

FIG. 3 is a diagram illustrating construction of an agent execution context and binding of policy artifacts based on associated metadata.

As shown in FIG. 3, the execution context manager (120) receives a request and associated metadata (302). The metadata (302) may include, without limitation, identity, role, credential lineage, organizational affiliation, jurisdiction, risk classification, purpose constraint, time or session scope constraint, delegation authority, or combinations thereof.

The execution context manager (120) constructs an agent execution context (300) and binds the metadata (302) to the agent execution context (300) as structured attributes. The agent execution context (300) serves as a computational boundary under which one or more reasoning engines operate including reasoning engines (1300).

The governance control plane selects at least one policy artifact (304) applicable to the agent execution context (300) based on the bound metadata (302). The policy artifact (304) may be identified by a policy identifier and version and may define policy constraints, delegation constraints, obligation definitions, enforcement parameters, and other rules applicable to the agent execution context (300).

In certain embodiments, selection of the policy artifact (304) is conditioned on one or more metadata attributes, including jurisdiction, role, risk classification, purpose constraint, or time or session scope constraint. The selected policy artifact (304) is associated with the agent execution context (300) prior to routing governed context to a reasoning engine.

The agent execution context (300) and associated policy artifact (304) are supplied to the policy constraint engine (130) for evaluation of proposed outputs and proposed actions.

The agent execution context (300) may further be associated with a session memory governance module (122), which may enforce limits on retention, reuse, or persistence of contextual information based on metadata or policy constraints.

The binding of metadata (302) and policy artifact (304) to the agent execution context (300) occurs prior to evaluation of proposed outputs or proposed actions and prior to effectuation. In this manner, policy constraints are structurally integrated into the execution context rather than applied as advisory filtering after generation.

The relationships illustrated in FIG. 3 are logical and may be implemented using data structures, session objects, containerized processes, or other computational representations capable of associating metadata and policy artifacts with execution.

REFERENCE LIST

120—EXECUTION CONTEXT MANAGER
122—SESSION MEMORY GOVERNANCE MODULE
130—POLICY CONSTRAINT ENGINE
300—AGENT EXECUTION CONTEXT
302—METADATA
304—POLICY ARTIFACT

Figure 4:
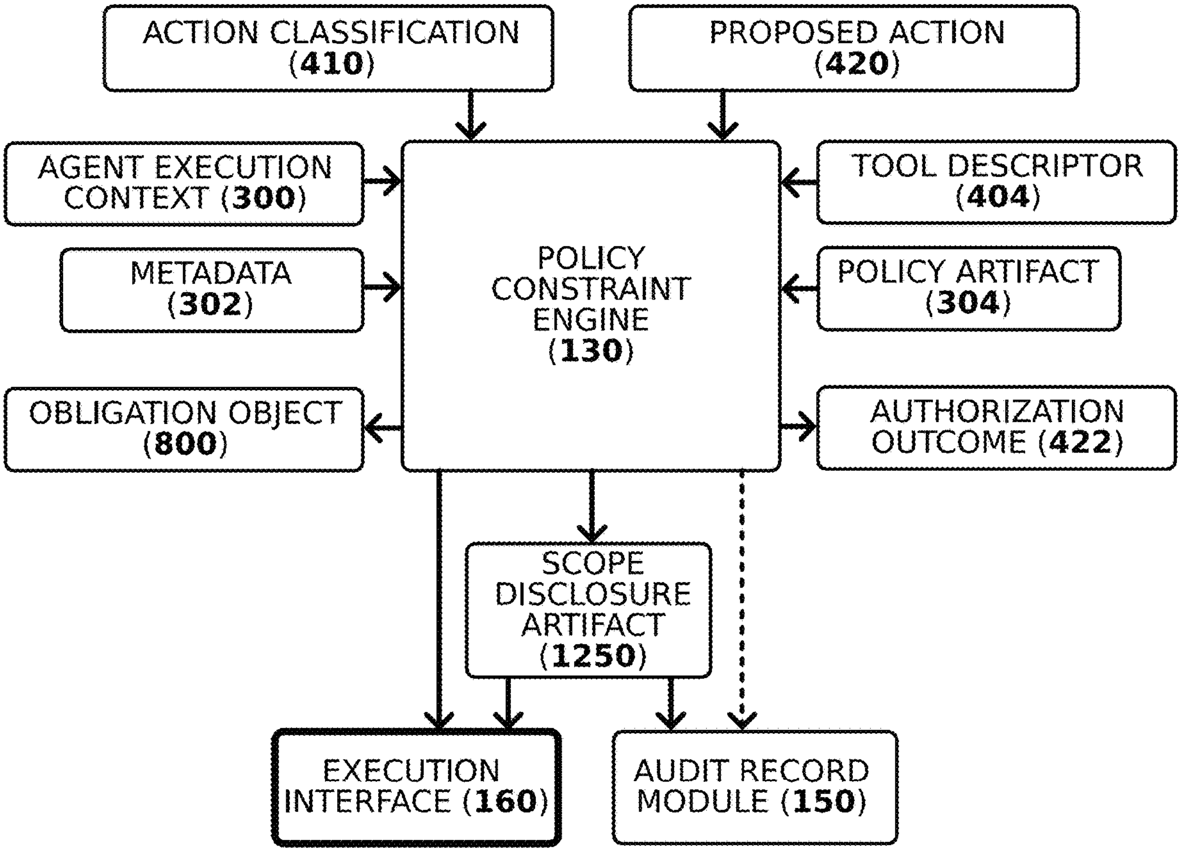
FIG. 4 is a diagram illustrating an example policy artifact and its use by a policy constraint engine to evaluate a proposed output or proposed action and to generate one or more governance artifacts.

FIG. 4 Policy Artifact Structure and Evaluation Model

FIG. 4 is a diagram illustrating an example structure of a policy artifact and its interaction with the policy constraint engine during evaluation of a proposed output or proposed action (420).

As shown in FIG. 4, a policy artifact (304) is an identifiable representation of policy constraints applicable to an agent execution context (300). The policy artifact (304) may be identified by a policy identifier and version and may include structured rule definitions and associated parameters. The policy artifact (304) may define action classification (410) permissions, tool or resource scope definitions, delegation constraints, obligation definitions, risk thresholds, escalation conditions, enforcement parameters, audit recording requirements, and data source requirements or visibility constraints applicable to the agent execution context (300).

The policy constraint engine (130) receives as evaluation inputs the agent execution context (300), metadata (302) associated with the execution context, the policy artifact (304), an action classification (410) associated with a proposed output or proposed action (420), and, when applicable, a tool descriptor (404) corresponding to a referenced external capability.

The policy constraint engine (130) applies the policy artifact (304) to the evaluation inputs and generates an authorization outcome (422) selected from allow, deny, modify, defer, or escalate. In particular implementations, the policy constraint engine (130) may additionally generate one or more obligation objects (800) based on conditions defined in the policy artifact (304), and may generate enforcement parameters that are supplied to the execution interface (160) for runtime enforcement.

In some configurations, the policy constraint engine (130) further generates a scope disclosure artifact (1250) associated with the proposed output or proposed action (420). The scope disclosure artifact (1250) may represent reviewed data sources, contextual inputs supplied as governed context, data sources declared unavailable, data sources excluded by policy constraints, signal streams not observed within a defined interval, or detected conflicts between available data sources. The scope disclosure artifact (1250) may be associated with the proposed output, transmitted to the execution interface (160), transmitted to a downstream node, or appended to a governed audit record (1004) by the audit record module (150).

The relationships illustrated in FIG. 4 represent logical evaluation and artifact generation and do not require a particular rule engine implementation or evaluation methodology.

REFERENCE LIST

130—POLICY CONSTRAINT ENGINE
150—AUDIT RECORD MODULE
160—EXECUTION INTERFACE
300—AGENT EXECUTION CONTEXT
302—METADATA
304—POLICY ARTIFACT
404—TOOL DESCRIPTOR
410—ACTION CLASSIFICATION
420—PROPOSED ACTION
422—AUTHORIZATION OUTCOME
800—OBLIGATION OBJECT
1250—SCOPE DISCLOSURE ARTIFACT

Figure 5:
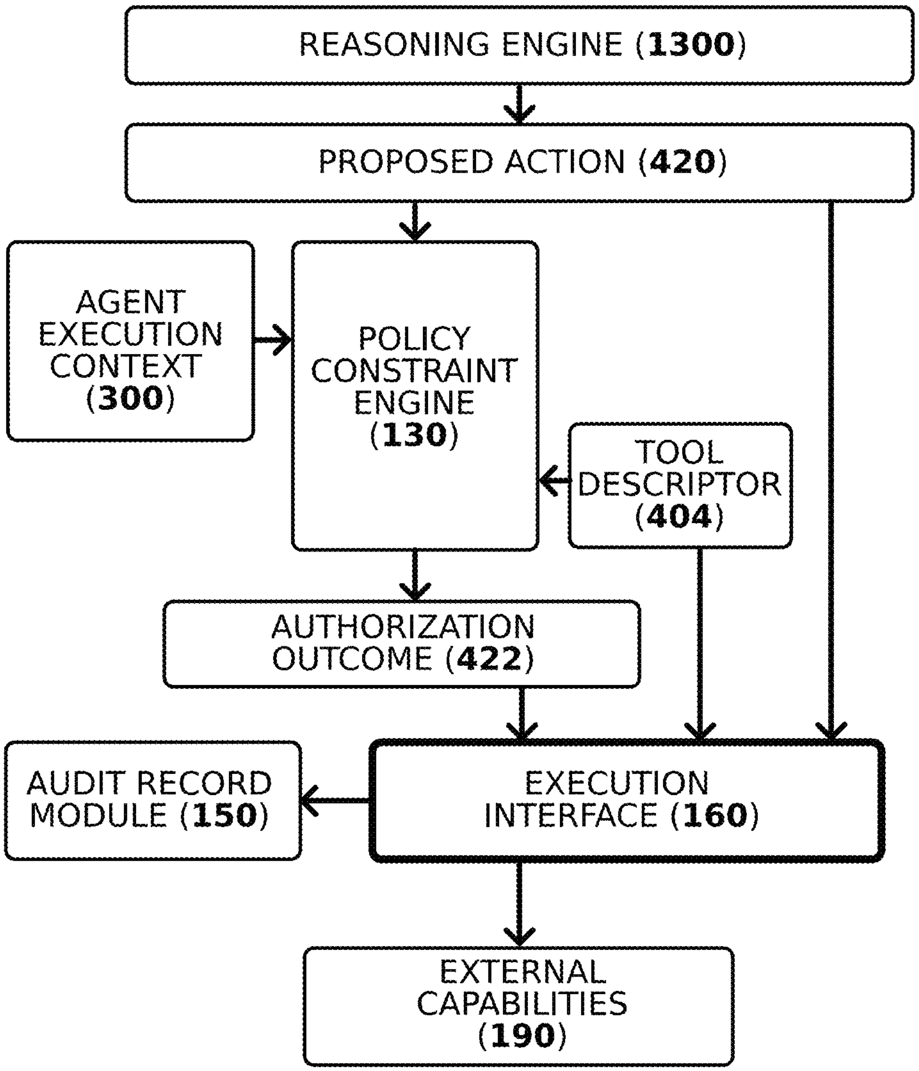
FIG. 5 is a block diagram illustrating an execution interface positioned as a runtime mediation boundary between one or more reasoning engines and external capabilities.

FIG. 5 Execution Interface as Runtime Mediation Boundary

FIG. 5 is a block diagram illustrating the execution interface (160) positioned as a runtime mediation boundary between reasoning engines (1300) and external capabilities (190), including service interfaces or inter-service interfaces.

In certain embodiments, reasoning engines (1300) generate proposed outputs or proposed actions but do not directly invoke or effectuate external capabilities (190), and effectuation occurs only through the execution interface (160) under governance control.

As shown in FIG. 5, one or more reasoning engines (1300) generate a proposed action (420) intended to invoke or modify an external capability (190). The proposed action is associated with an agent execution context (300) and is evaluated by the policy constraint engine (130), which generates an authorization outcome (422).

The proposed action is not directly effectuated by the reasoning engine (1300) and is routed to the execution interface (160) only for governed runtime mediation under the authorization outcome (422).

Rather than permitting direct invocation of the external capability (190), the proposed action (420) is routed to the execution interface (160). The execution interface (160) serves as a mediation component that controls effectuation of tool calls, application programming interface invocations, workflow actions, device commands, or downstream service invocations.

The execution interface (160) receives: the proposed action (420), the authorization outcome (422), and a tool descriptor (404) associated with the referenced external capability.

The execution interface (160) evaluates whether effectuation is permitted within the authorized scope defined by the authorization outcome (422) and the tool descriptor (404).

When the authorization outcome is allow, the execution interface (160) permits effectuation of the proposed action (420) against the external capability (190).

When the authorization outcome is deny, the execution interface (160) prevents effectuation and may block delivery, suppress invocation, or terminate an in-progress invocation.

When the authorization outcome is modify, the execution interface (160) may narrow scope, redact parameters, substitute an alternate action variant, or apply rate limits prior to effectuation.

When the authorization outcome is defer, the execution interface (160) may withhold dispatch until a prerequisite condition or required event is satisfied.

When the authorization outcome is escalate, the governance control plane may route the proposed action (420) for supervisory review prior to permitting effectuation.

In certain embodiments, the execution interface (160) is designated as the sole egress pathway for effectuation such that reasoning engines (1300) are not permitted to directly invoke external capabilities (190), including service interfaces or inter-service interfaces. In such embodiments, invocation of tools, application programming interfaces, workflow engines, devices, downstream services, or internal service endpoints occurs through the execution interface (160) under governance control. Restriction of direct invocation may be implemented using access control mechanisms, service wrappers, network controls, credential isolation, or other architectural constraints appropriate to the deployment environment.

The execution interface (160) may record attempted, permitted, modified, deferred, denied, or terminated invocations and supply such information to the audit record module (150) for inclusion in governed audit records (1004).

The relationships illustrated in FIG. 5 represent a logical control boundary and may be implemented within a single node or across distributed computing nodes.

REFERENCE LIST

Figure 6:
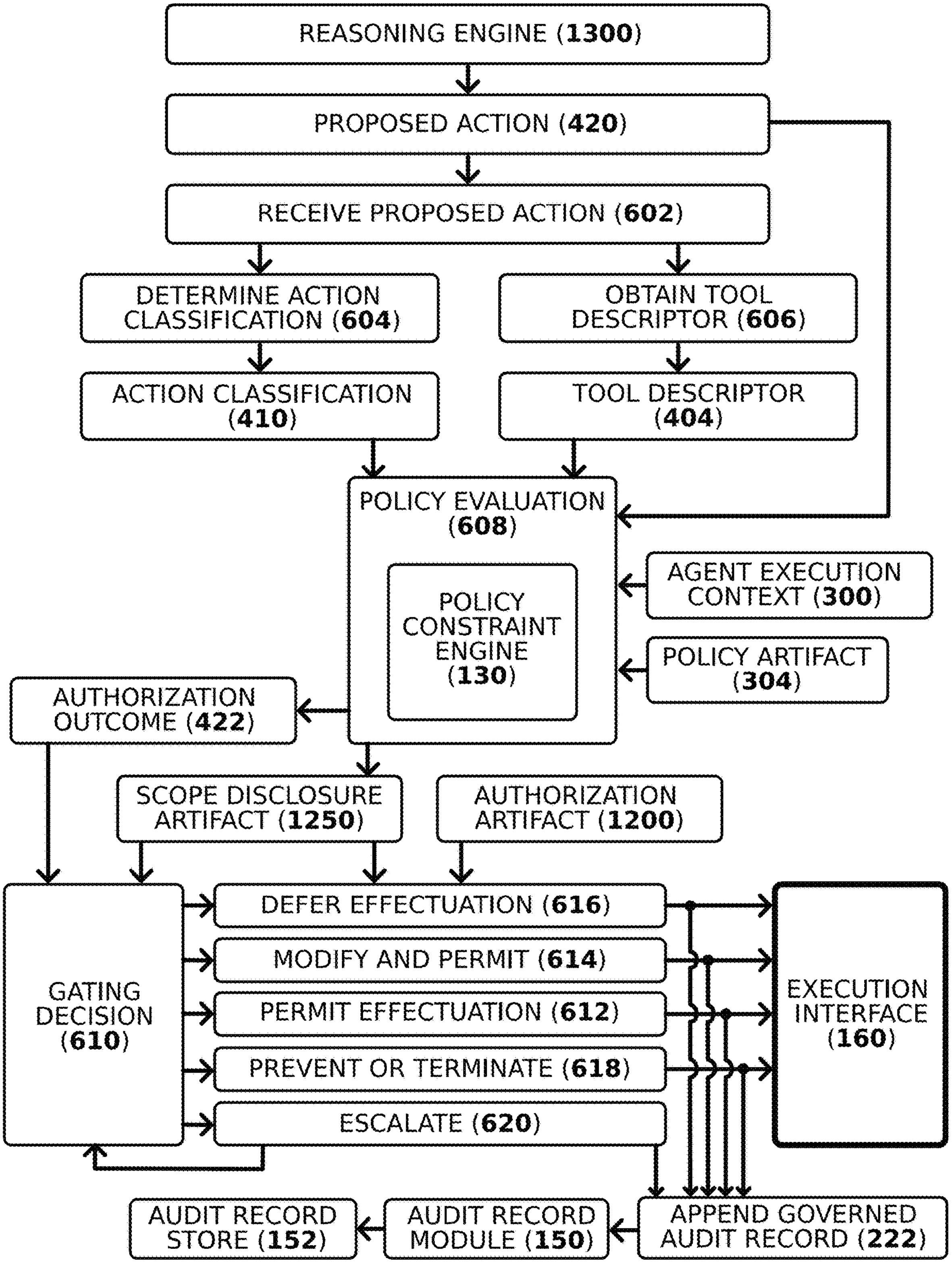
FIG. 6 is a flow diagram illustrating runtime authorization gating and effectuation control for a proposed action, including computation of an action classification used to select applicable policy constraints, generation of an authorization outcome by a policy constraint engine, runtime enforcement of the authorization outcome prior to effectuation, and recording of enforcement outcomes.

130—POLICY CONSTRAINT ENGINE
150—AUDIT RECORD MODULE
160—EXECUTION INTERFACE
190—EXTERNAL CAPABILITIES
300—AGENT EXECUTION CONTEXT (may be shown optionally feeding 130)
404—TOOL DESCRIPTOR
420—PROPOSED ACTION
422—AUTHORIZATION OUTCOME
1300—REASONING ENGINE FIG. 6 Runtime Authorization Gating and Effectuation Control FIG. 6 is a flow diagram illustrating runtime authorization gating performed by the governance control plane prior to effectuation of a proposed action (420).

Upon receiving a proposed action (420), the governance control plane determines an action classification (410) and obtains associated capability metadata, including a tool descriptor (404) when present. The policy constraint engine performs policy evaluation (608) under the applicable execution context (300) and policy artifact (304) and produces an authorization outcome (422), which is realized through a gating decision (610) that selects the enforcement path. The gating decision selects among permitting effectuation (612), modifying and permitting (614), deferring effectuation (616), preventing or terminating (618), or escalating (620). In this manner, action classification operates as a control input to the authorization outcome and gating behavior.

At step (602), the governance control plane receives a proposed action (420) generated by one or more reasoning engines (1300). The proposed action (420) may reference a tool, application programming interface, workflow engine, device, or downstream service.

At step (604), an action classification (410) is computed for the proposed action (420) by transforming structured attributes of the proposed action into a discrete action class identifier prior to policy evaluation.

At step (606), a tool descriptor (404) associated with the referenced external capability is obtained. The tool descriptor (404) may include an identifier and a permitted scope definition and may further include parameter constraints, required privileges, jurisdictional attributes, or risk attributes.

At step (608), the policy constraint engine (130) evaluates the proposed action (420) under the applicable policy artifact (304) and the agent execution context (300), and generates an authorization outcome (422). In certain embodiments, the policy constraint engine (130) also generates enforcement parameters and, when required under applicable policy constraints, a scope disclosure artifact (1250).

At decision step (610), the governance control plane applies the authorization outcome (422) to determine the corresponding enforcement path.

The authorization outcome (422) is the computed result of policy evaluation (608), and the gating decision (610) applies the authorization outcome by selecting the enforcement path through the execution interface (160); together these operations implement the policy constraint evaluation stage (210) shown in FIG. 2.

In embodiments in which generation or association of a scope disclosure artifact (1250) is required under applicable policy constraints, the governance control plane verifies that the scope disclosure artifact (1250) has been generated and associated with the proposed action (420) prior to permitting effectuation.

In certain embodiments, the authorization outcome (422) produced by policy evaluation (608) is applied through gating decision (610), which selects the enforcement path executed by the execution interface (160).

If the authorization outcome is allow, at step (612) the execution interface (160) permits effectuation within the permitted scope defined by the authorization outcome (422)

and the tool descriptor (404), subject to any applicable enforcement parameters and scope disclosure requirements.

If the authorization outcome is modify, at step (614) the execution interface (160) modifies the proposed action (420) in accordance with policy constraints prior to permitting effectuation. Such modification may include narrowing scope, redacting parameters, substituting an alternate action variant, or applying rate limits.

If the authorization outcome is defer, at step (616) the execution interface (160) withholds dispatch pending satisfaction of a prerequisite condition or required event. In one implementation, deferral may require presentation or validation of an authorization artifact (1200) or completion of generation or association of a scope disclosure artifact (1250).

If the authorization outcome is deny, at step (618) the execution interface (160) prevents effectuation and may block invocation, suppress delivery, or terminate an in-progress invocation.

If the authorization outcome is escalate, at step (620) the governance control plane routes the proposed action (420) for supervisory review prior to permitting effectuation.

At step (222), the audit record module (150) appends a governed audit record to the audit record store (152), capturing at least the action classification, tool identifier, policy identifier and version, authorization outcome, enforcement action, and, when applicable, information identifying the scope disclosure artifact (1250). FIG. 6 illustrates runtime control and artifact-aware gating at a logical level. The depicted flow should not be interpreted as tied to any specific programming model or evaluation sequence, except where policy constraints impose ordering.

REFERENCE LIST

130—POLICY CONSTRAINT ENGINE
150—AUDIT RECORD MODULE
152—AUDIT RECORD STORE
160—EXECUTION INTERFACE
300—AGENT EXECUTION CONTEXT
304—POLICY ARTIFACT
404—TOOL DESCRIPTOR
410—ACTION CLASSIFICATION
420—PROPOSED ACTION
422—AUTHORIZATION OUTCOME
1200—AUTHORIZATION ARTIFACT
1250—SCOPE DISCLOSURE ARTIFACT
602—RECEIVE PROPOSED ACTION
604—DETERMINE ACTION CLASSIFICATION
606—OBTAIN TOOL DESCRIPTOR
608—POLICY EVALUATION
610—GATING DECISION
612—PERMIT EFFECTUATION
614—MODIFY AND PERMIT
616—DEFER EFFECTUATION
618—PREVENT OR TERMINATE
620—ESCALATE
222—APPEND GOVERNED AUDIT RECORD

Figure 7:
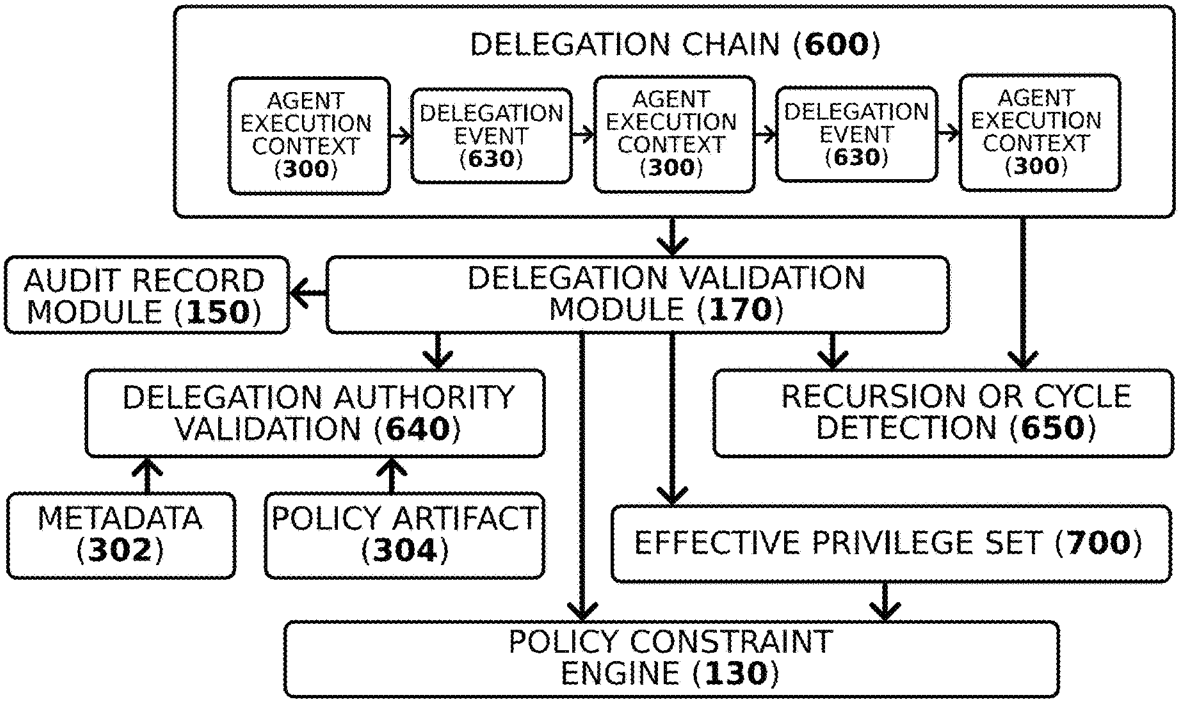
FIG. 7 is a diagram illustrating representation and validation of a delegation chain, including delegation authority validation, recursion or cycle detection, and privilege inheritance limitation.

FIG. 7 Delegation Chain Representation and Validation

FIG. 7 is a diagram illustrating structured representation and validation of a delegation chain within the governance control plane.

As shown in FIG. 7, delegation among agents or execution contexts is represented as a delegation chain (600). The delegation chain (600) may be implemented as a sequence or as a directed graph comprising nodes and edges.

Nodes in the delegation chain (600) may correspond to agent identities, agent execution contexts (300), or task identifiers. Edges correspond to delegation events (630), each representing assignment or transfer of performance of a task, tool use, data access, or action class from a delegating execution context to a delegated execution context.

When a delegation event (630) is proposed, the delegation validation module (170) evaluates the delegation chain (600) before permitting the delegated execution to proceed.

Delegation validation may include delegation authority validation (640), in which the governance control plane determines whether the delegating execution context possesses sufficient delegation authority under applicable metadata (302) and policy artifacts (304). Delegation authority validation (640) may evaluate credential lineage, role attributes, jurisdiction, purpose constraints, risk classification, and other metadata associated with the delegating execution context.

The delegation validation module (170) may perform recursion detection or cycle detection (650) on the delegation chain (600). Recursion detection or cycle detection (650) may include identifying repeated identifiers within the delegation chain (600), including repeated agent identities, execution context identifiers, task identifiers, or delegation edges.

In some configurations, the delegation validation module (170) computes an effective privilege set (700) for the delegated execution context. The effective privilege set (700) may be determined by limiting inherited privileges based on policy-defined inheritance constraints and the privilege scope of the delegating execution context.

If delegation authority is insufficient, if privilege inheritance would exceed permitted scope, or if recursion or a cycle is detected, the governance control plane may deny the proposed delegation, suspend execution, restrict further delegation, or escalate for supervisory review.

Delegation validation results, including computed effective privilege sets (700) and any denial or escalation decisions, may be supplied to the policy constraint engine (130) and recorded by the audit record module (150) in a governed audit record (1004).

The representation illustrated in FIG. 7 is logical and may be implemented using data structures, adjacency mappings, graph representations, or other computational mechanisms capable of tracking delegation relationships.

REFERENCE LIST

130—POLICY CONSTRAINT ENGINE
150—AUDIT RECORD MODULE
170—DELEGATION VALIDATION MODULE
300—AGENT EXECUTION CONTEXT
302—METADATA
304—POLICY ARTIFACT
600—DELEGATION CHAIN
630—DELEGATION EVENT
640—DELEGATION AUTHORITY VALIDATION
650—RECURSION OR CYCLE DETECTION
700—EFFECTIVE PRIVILEGE SET

Figure 8:
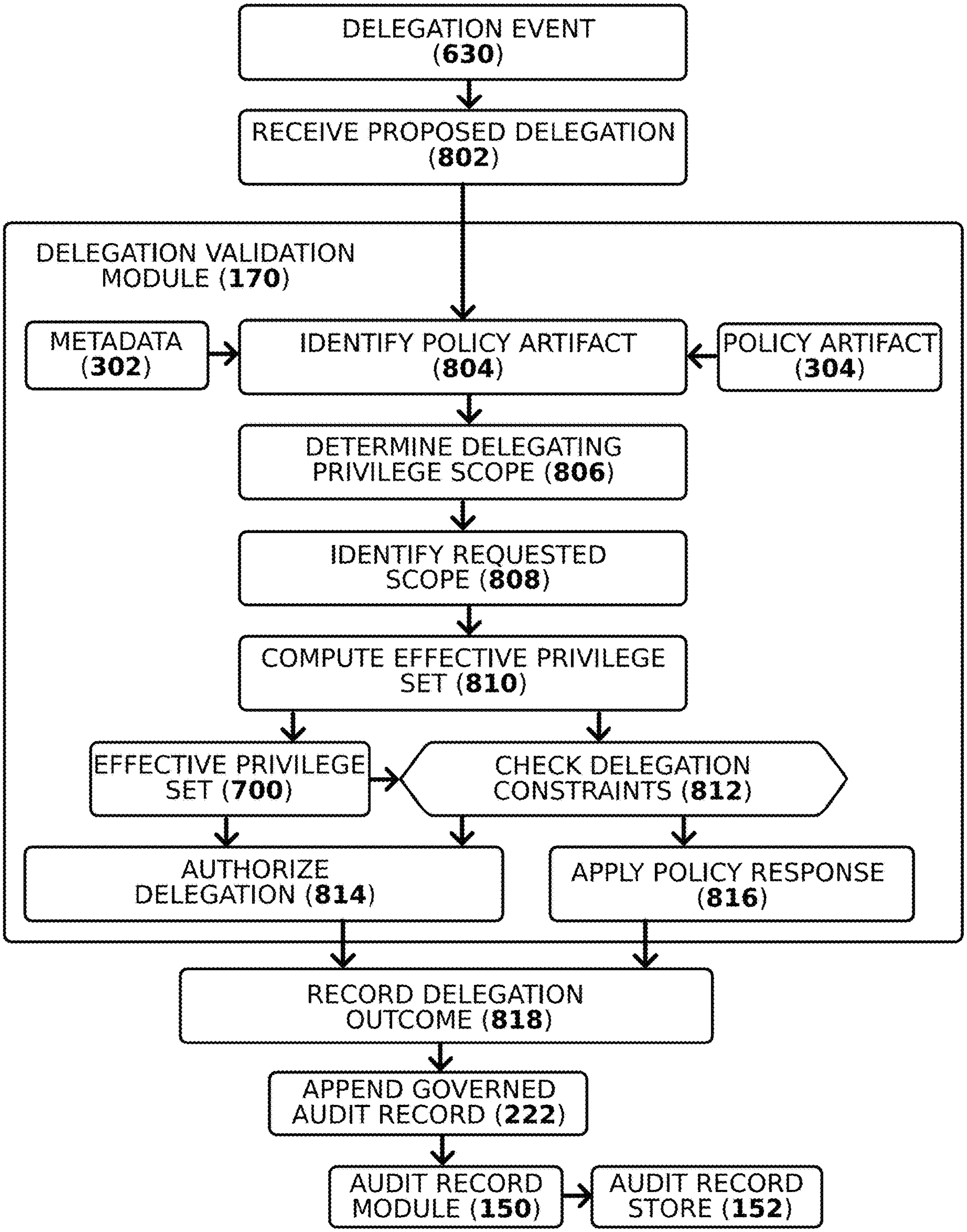
FIG. 8 is a flow diagram illustrating computation of an effective privilege set for a delegated execution context under delegation constraints.

FIG. 8 Effective Privilege Computation for Delegation

FIG. 8 is a flow diagram illustrating computation of an effective privilege set for a delegated execution context when delegation among agents occurs.

At step (802), the governance control plane receives a proposed delegation event (630) in which a delegating execution context assigns performance of a task to a delegated execution context. The proposed delegation may include a requested scope comprising one or more of tool scope, data scope, workflow permissions, or action classifications.

At step (804), the delegation validation module (170) obtains metadata (302) associated with the delegating execution context and the delegated execution context, and identifies an applicable policy artifact (304) based on the metadata. The policy artifact (304) may define delegation constraints and inheritance limits applicable to the proposed delegation.

At step (806), the delegation validation module (170) determines a privilege scope associated with the delegating execution context. The privilege scope may represent permissions currently authorized for the delegating execution context under the applicable policy artifact (304).

At step (808), the delegation validation module (170) determines whether a requested scope is specified by the proposed delegation event, and if so, identifies the requested scope to be evaluated under delegation constraints.

At step (810), the delegation validation module (170) applies privilege inheritance limitation rules defined by the policy artifact (304) to compute an effective privilege set (700) for the delegated execution context. In certain embodiments, the effective privilege set (700) is computed by limiting inherited privileges to an intersection of: (i) the privilege scope of the delegating execution context, (ii) the requested scope, and (iii) policy-defined inheritance limits applicable to the delegated execution context.

At decision step (812), the governance control plane determines whether the computed effective privilege set (700) satisfies applicable delegation constraints. Delegation constraints may include limits based on role, credential lineage, jurisdiction, risk classification, purpose constraint, time or session scope constraint, or combinations thereof.

If the delegation constraints are satisfied, at step (814) the governance control plane authorizes the delegation and associates the effective privilege set (700) with the delegated execution context for subsequent policy evaluation and gating of proposed outputs or proposed actions.

If the delegation constraints are not satisfied, at step (816) the governance control plane applies a policy-defined response, which may include denial of the delegation, suspension of the delegation, restriction of permitted actions, or escalation for supervisory review.

At step (818), the audit record module (150) appends a governed audit record (1004) to the audit record store (152), capturing the delegation event (630), the computed effective privilege set (700), and any authorization, denial, restriction, or escalation action FIG. 8 illustrates logical computation of effective privileges and enforcement of delegation constraints. The implementation need not rely on any particular internal privilege model, so long as policy-defined inheritance limits are computed and enforced.

REFERENCE LIST

150—AUDIT RECORD MODULE
152—AUDIT RECORD STORE
170—DELEGATION VALIDATION MODULE
222—APPEND GOVERNED AUDIT RECORD
302—METADATA
304—POLICY ARTIFACT
630—DELEGATION EVENT
700—EFFECTIVE PRIVILEGE SET
802—RECEIVE PROPOSED DELEGATION
804—IDENTIFY POLICY ARTIFACT
806—DETERMINE DELEGATING PRIVILEGE SCOPE
808—IDENTIFY REQUESTED SCOPE
810—COMPUTE EFFECTIVE PRIVILEGE SET
812—CHECK DELEGATION CONSTRAINTS
814—AUTHORIZE DELEGATION
816—APPLY POLICY RESPONSE
818—RECORD DELEGATION OUTCOME

Figure 9:
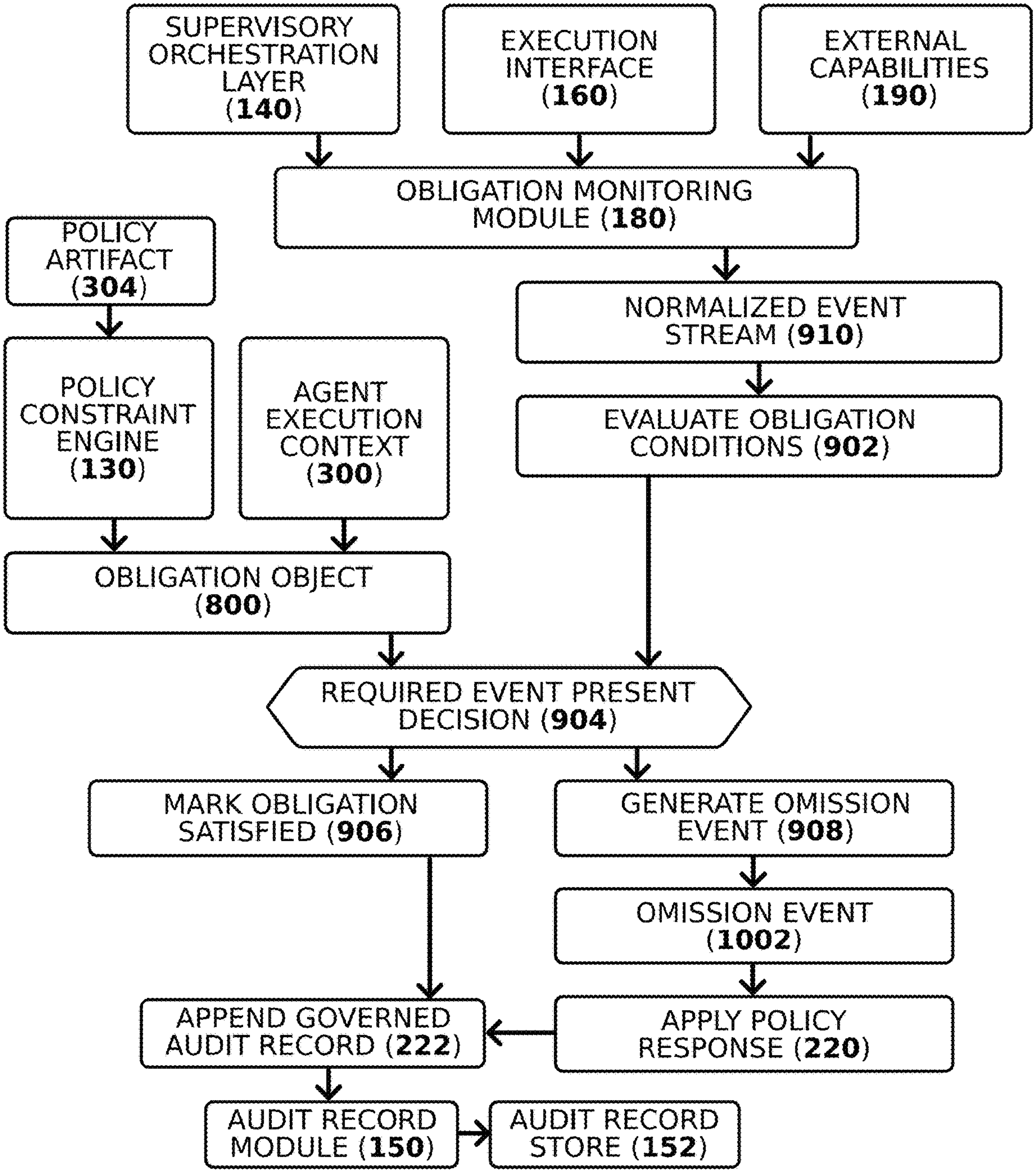
FIG. 9 is a diagram illustrating an obligation object and deterministic omission evaluation using a normalized event stream, including determination that a required event is absent prior to expiration of a defined time window, generation of a corresponding omission event, and application of a policy-defined response.

FIG. 9 Obligation Object Structure and Deterministic Omission Evaluation

FIG. 9 is a combined structural and timeline diagram illustrating an obligation object and deterministic omission evaluation performed by the governance control plane.

As shown in FIG. 9, an obligation object (800) is associated with an agent execution context (300). The obligation object (800) may be generated by the policy constraint engine (130) based on conditions defined in a policy artifact (304), or may be created in response to a delegation event or other workflow condition.

The obligation object (800) may include structured fields comprising: an obligation identifier, a required event type, a start condition, a time window, an expiration condition, one or more enforcement parameters, and an associated policy identifier and version.

The time window defines a temporal interval beginning at the start condition and ending at the expiration condition.

The obligation monitoring module (180) receives events from system components including the supervisory orchestration layer (140), the execution interface (160), external capabilities (190), and other internal or distributed modules. The obligation monitoring module (180) normalizes the received events into a normalized event stream (910) using a defined event schema. Each entry in the normalized event stream (910) includes at least an event type, a timestamp, and an associated execution context identifier sufficient to correlate the event with one or more obligation objects (800).

At step (902), the obligation monitoring module (180) evaluates obligation conditions associated with the obligation object (800) against the normalized event stream (910). Evaluation includes determining whether a required event corresponding to the obligation identifier appears in the normalized event stream (910) within the defined time window and prior to expiration of the defined time window.

At decision step (904), the obligation monitoring module (180) determines whether the required event has been detected within the defined time window.

If the required event is detected within the time window, at step (906) the obligation object (800) is marked as satisfied. Satisfaction of the obligation object (800) may be recorded by the audit record module (150), and at step (222) a governed audit record is appended to the audit record store (152).

If the required event is absent prior to expiration of the defined time window, at step (908) the obligation monitoring module (180) generates an omission event (1002). The omission event (1002) may include the obligation identifier, the execution context identifier, a timestamp corresponding to the expiration condition, and an associated policy identifier and version.

Upon generation of the omission event (1002), at step (220) the governance control plane applies a policy-defined response. The policy-defined response may include suspension of execution associated with the agent execution context (300), reduction of autonomy, blocking of further proposed actions through the execution interface (160), escalation for supervisory review, notification, or invocation of a remediation workflow.

Following application of the policy-defined response, at step (222) the audit record module (150) appends a governed audit record to the audit record store (152), capturing the omission event (1002) and the applied policy-defined response.

In some configurations, absence of a required data source or required signal channel within the defined time window may constitute failure of the required event and may result in generation of an omission event (1002).

The relationships illustrated in FIG. 9 represent logical structures and evaluation conditions and do not require a particular event processing framework beyond the capability to normalize events and evaluate time-bounded conditions deterministically.

REFERENCE LIST

130—POLICY CONSTRAINT ENGINE
140—SUPERVISORY ORCHESTRATION LAYER
150—AUDIT RECORD MODULE
152—AUDIT RECORD STORE
160—EXECUTION INTERFACE
180—OBLIGATION MONITORING MODULE
190—EXTERNAL CAPABILITIES
220—APPLY POLICY RESPONSE
222—APPEND GOVERNED AUDIT RECORD
300—AGENT EXECUTION CONTEXT
304—POLICY ARTIFACT
800—OBLIGATION OBJECT
902—EVALUATE OBLIGATION CONDITIONS
904—REQUIRED EVENT PRESENT DECISION
906—MARK OBLIGATION SATISFIED
908—GENERATE OMISSION EVENT
910—NORMALIZED EVENT STREAM
1002—OMISSION EVENT

Figure 10:
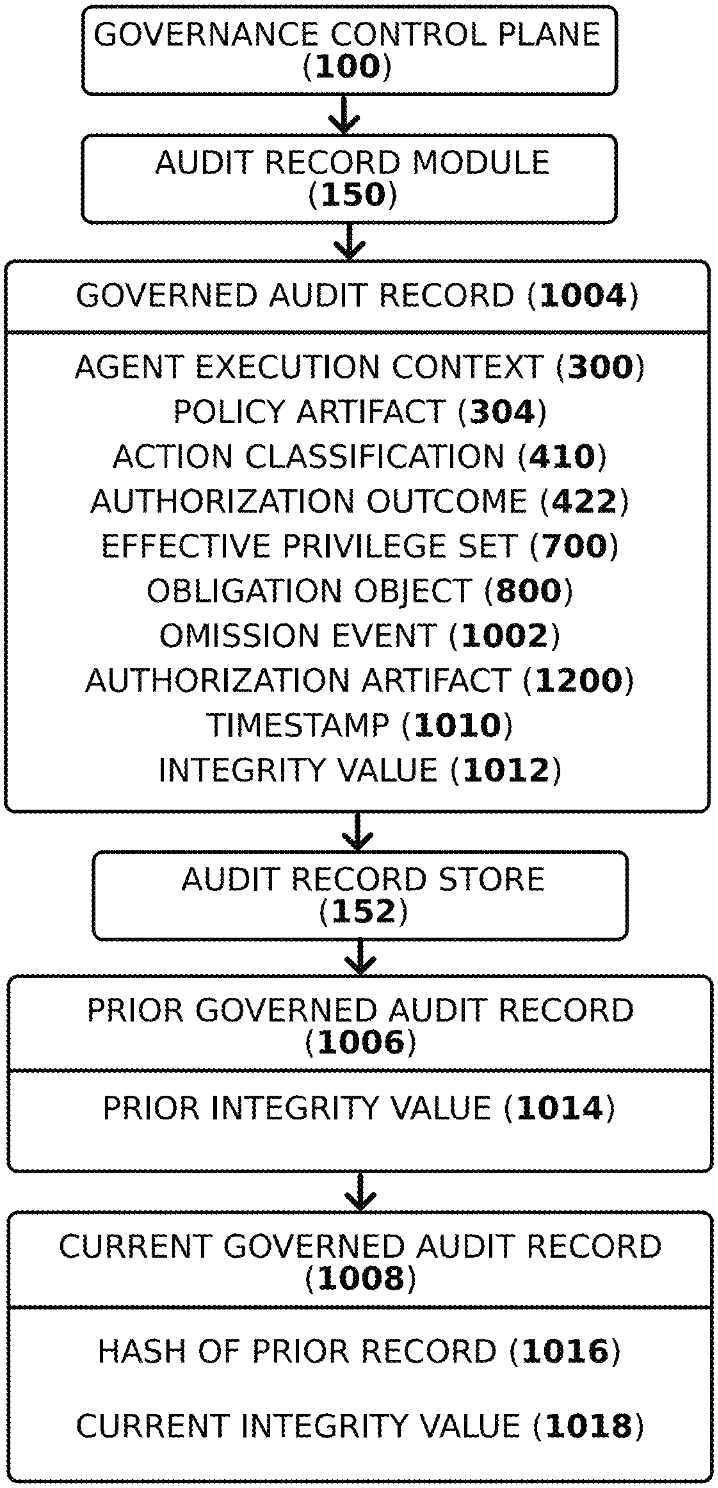
FIG. 10 is a diagram illustrating structure of governed audit records and cryptographic linkage between successive records stored in an audit record store.

FIG. 10 Governed Audit Record Structure and Cryptographic Linkage

FIG. 10 is a diagram illustrating the structure of a governed audit record and cryptographic linkage between successive records stored in an audit record store.

As shown in FIG. 10, the audit record module (150) generates a governed audit record (1004) in response to governance relevant events occurring within the governance control plane (100). Governance relevant events include generation of an authorization outcome (422), enforcement actions performed by the execution interface (160), delegation validation results produced by the delegation validation module (170), computation or association of an effective privilege set (700), creation or satisfaction of an obligation object (800), generation of an omission event (1002), and issuance, validation, expiration, or rejection of an authorization artifact (1200). The governed audit record (1004) is generated as a structured data object that captures governance state independent of model generated output.

A governed audit record (1004) is a machine-readable structured representation generated by the governance control plane. The record is associated with an agent execution context (300) through an execution context identifier. The record further includes a policy identifier and version corresponding to the policy artifact (304) applied at the time of evaluation.

Where applicable, the governed audit record includes an action classification (410), an authorization outcome (422), and a gating decision. The record may also include enforcement parameters applied by the execution interface (160).

When delegation validation occurs, the governed audit record may include delegation validation results and, where computed, a corresponding effective privilege set (700). If an obligation object is active or evaluated, the record may include an obligation identifier and, when applicable, an omission event (1002).

In implementations utilizing authorization artifacts, the governed audit record may include an authorization artifact identifier (1200). The record further includes a timestamp (1010) representing the time of evaluation, authorization, enforcement, or event occurrence.

An integrity value (1012) is associated with the governed audit record to support tamper detection. Where the record is linked to a prior governed audit record (1006), the integrity value may incorporate or reference a prior integrity value (1014). When associated with a current governed audit record (1008), the integrity value may correspond to a current integrity value (1018), thereby enabling cryptographic linkage across successive records.

The governed audit record (1004) may be implemented as a serialized object, structured record, ledger entry, database entry, append-only log entry, or other persistent data representation capable of deterministic storage and retrieval.

The governed audit record (1004) is appended to the audit record store (152). In certain embodiments, the audit record store (152) is implemented as an append only data structure, log, ledger, database, or object store. Appending rather than overwriting preserves prior governance decisions and prevents destructive modification during normal system operation.

Successive governed audit records may be cryptographically linked through an ordered relationship between a prior governed audit record (1006) and a current governed audit record (1008).

The prior governed audit record (1006) includes a prior integrity value (1014) computed over its contents. A hash of the prior record (1016) is derived from at least the prior governed audit record (1006) and, in some configurations, from the prior integrity value (1014).

The current governed audit record (1008) incorporates the hash of the prior record (1016) into its current integrity value (1018). Inclusion of the prior hash establishes a chained cryptographic relationship between the prior and current governed audit records. Modification of the prior record changes the derived hash and results in a detectable integrity inconsistency within the sequence.

The current integrity value (1018) may be computed using hashing functions, digital signatures, message authentication codes, or other cryptographic mechanisms capable of detecting tampering.

The current integrity value (1018) incorporates the hash of the prior record (1016). Because the hash of the prior record is derived from the contents of the prior governed audit record (1006), any modification of the prior record alters the derived hash. A mismatch between the prior integrity value (1014), the stored hash of the prior record (1016), and the current integrity value (1018) indicates alteration within the record sequence.

The ordered incorporation of prior-record hashes establishes a chained integrity relationship across successive governed audit records, enabling detection of tampering within the sequence.

In distributed embodiments, governed audit records (1004), including a current governed audit record (1008), generated at one node may be transmitted to another node and appended to a local audit record store (152). Prior to acceptance, the receiving node may validate the current integrity value (1018), confirm continuity with the prior governed audit record (1006), verify consistency of the hash of prior record (1016), and ensure that referenced authorization artifacts (1200) or related governance identifiers are recognized under locally applicable policy constraints.

The structure illustrated in FIG. 10 provides a concrete technical mechanism for persistent recording of governance decisions independent of model output content. The governed audit record (1004) enables reconstruction of execution context, applied policy artifact (304), authorization outcome (422), delegation validation results, effective privilege computation (700), obligation evaluation results associated with obligation objects (800), omission events (1002), and authorization artifact usage (1200). The ordered cryptographic linkage between a prior governed audit record (1006) and a current governed audit record (1008) further enables detection of unauthorized modification and preservation of evidentiary integrity. This structure supports traceability, regulatory review, compliance analysis, forensic examination, and dispute resolution without reliance on regeneration of model output or post hoc interpretation.

The implementation described in FIG. 10 is not limited to a particular storage engine, cryptographic algorithm, or distributed architecture unless required by deployment constraints or regulatory obligations.

REFERENCE LIST

100—GOVERNANCE CONTROL PLANE
150—AUDIT RECORD MODULE
152—AUDIT RECORD STORE
160—EXECUTION INTERFACE
170—DELEGATION VALIDATION MODULE
300—AGENT EXECUTION CONTEXT
304—POLICY ARTIFACT
410—ACTION CLASSIFICATION
422—AUTHORIZATION OUTCOME
700—EFFECTIVE PRIVILEGE SET
800—OBLIGATION OBJECT
1002—OMISSION EVENT
1004—GOVERNED AUDIT RECORD
1006—PRIOR GOVERNED AUDIT RECORD
1008—CURRENT GOVERNED AUDIT RECORD
1010—TIMESTAMP
1012—INTEGRITY VALUE
1014—PRIOR INTEGRITY VALUE
1016—HASH OF PRIOR RECORD
1018—CURRENT INTEGRITY VALUE
1200—AUTHORIZATION ARTIFACT

Figure 11:
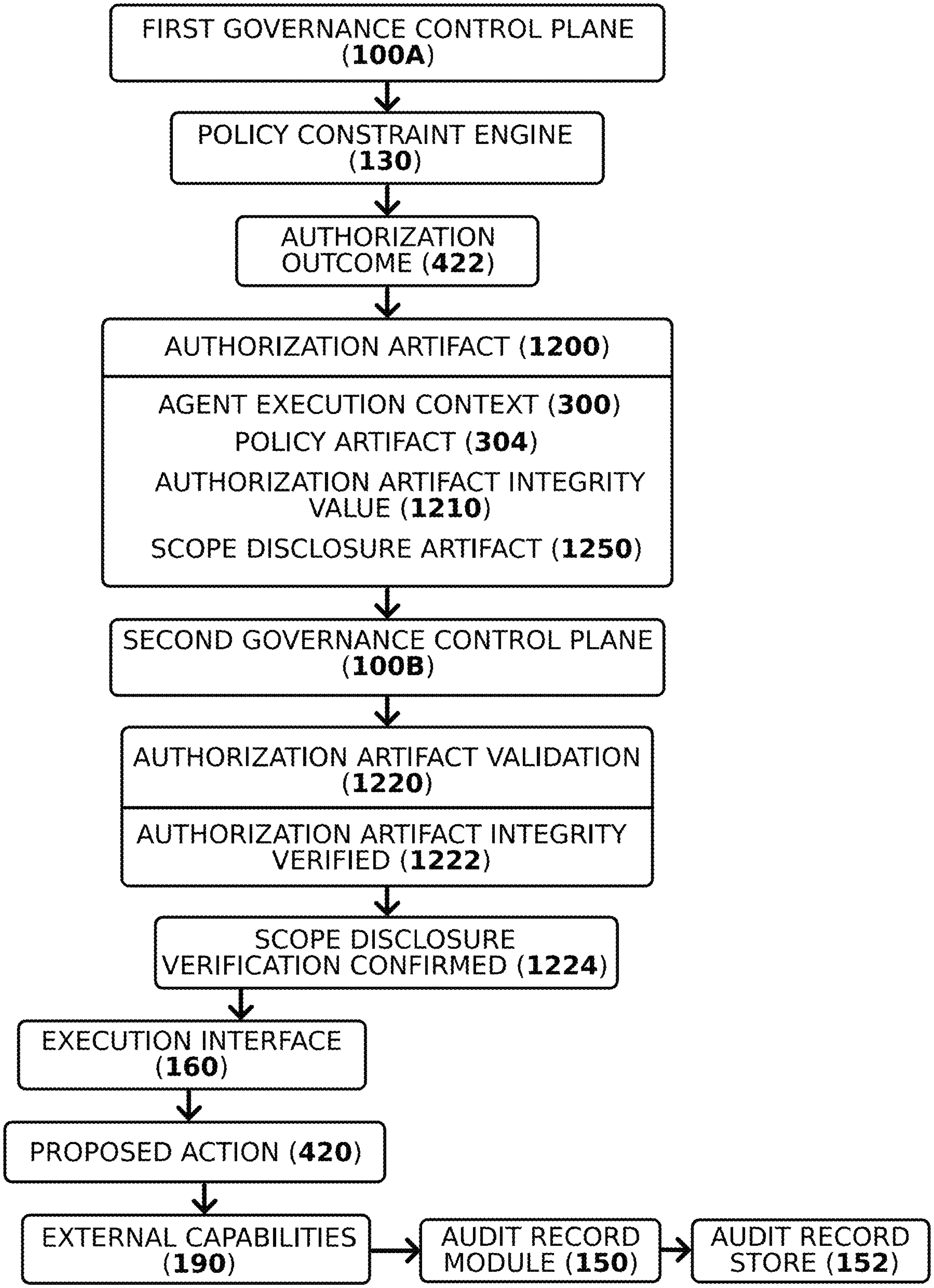
FIG. 11 is a diagram illustrating generation of an authorization artifact and validation of the authorization artifact across computing nodes prior to permitting effectuation of a proposed action, including integrity verification, scope correspondence checks, and expiration validation.

FIG. 11 Authorization Artifact Generation, Scope Association, and Cross-Node Validation FIG. 11 is a diagram illustrating generation of an authorization artifact and validation of the authorization artifact across computing nodes prior to effectuation of a proposed action (420).

As shown in FIG. 11, a first governance control plane (100A) operating at a first node evaluates a proposed output or proposed action (420) using a policy constraint engine (130) and generates an authorization outcome (422). When the authorization outcome permits effectuation within a defined scope, the first governance control plane (100A) generates an authorization artifact (1200).

The authorization artifact (1200) comprises a structured data representation including at least an artifact identifier, an execution context identifier associated with an agent execution context (300), a policy identifier and version corresponding to a policy artifact (304), a permitted scope definition, a time window or expiration condition, one or more constraint parameters, and an authorization artifact integrity value (1210). The authorization artifact integrity value (1210) is computed over at least a portion of the authorization artifact (1200) and is suitable for cryptographic validation of integrity and authenticity. In certain embodiments, the authorization artifact (1200) may further include references to an action classification, delegation lineage, or one or more obligation objects associated with the agent execution context.

The authorization artifact (1200) is transmitted from the first node to a second node that includes a second governance control plane (100B) or an execution interface (160) configured to require validation of authorization prior to effectuation.

If authorization artifact validation (1220) fails, the second governance control plane (100B) or execution interface (160) denies or defers effectuation of the proposed action (420) such that the proposed action is not invoked against the external capability (190) unless validation conditions are satisfied under locally applicable policy constraints.

At the second node, the governance control plane (100B) or execution interface (160) performs authorization artifact validation (1220) on the received authorization artifact (1200). Authorization artifact validation (1220) includes verification of the authorization artifact integrity value (1210). Upon successful verification of the authorization artifact integrity value (1210), an authorization artifact integrity verified state (1222) is established. Authorization artifact validation (1220) further includes confirmation that the policy identifier and version are recognized or acceptable under locally applicable policy constraints, verification that the authorization artifact (1200) has not expired, confirmation that the permitted scope definition aligns with the proposed action (420) to be effectuated, and confirmation that the execution context identifier corresponds to a recognized or authorized context.

In embodiments in which policy constraints require scope disclosure verification, authorization artifact validation (1220) further includes verification of the scope disclosure artifact (1250).

In certain embodiments, the scope disclosure artifact (1250) comprises a structured record associated with the proposed action (420) and including identifiers of reviewed data sources, unavailable or unreviewed sources, sources excluded under applicable policy constraints, detected conflicts among data inputs, and a timestamp associated with the proposal.

Upon successful verification of the scope disclosure artifact (1250), a scope disclosure verification confirmed state (1224) is established prior to permitting effectuation.

If authorization artifact validation (1220) succeeds, including establishment of the authorization artifact integrity verified state (1222) and when required the scope disclosure verification confirmed state (1224), the second governance control plane (100B) or execution interface (160) permits effectuation of the proposed action (420) against an external capability (190) within the permitted scope defined by the authorization artifact (1200).

If authorization artifact validation (1220) fails, the second governance control plane (100B) denies effectuation, defers effectuation, or escalates for supervisory review in accordance with locally applicable policy constraints.

Generation, transmission, authorization artifact validation (1220), establishment of the authorization artifact integrity verified state (1222), establishment of the scope disclosure verification confirmed state (1224), acceptance, denial, deferral, escalation, or expiration of the authorization artifact (1200) are recorded by the audit record module (150) in a governed audit record appended to the audit record store (152). In distributed embodiments, governed audit records generated at multiple nodes may be cryptographically linked or reconciled.

The relationships illustrated in FIG. 11 provide a technical mechanism for governance continuity across distributed systems by requiring validation of authorization artifacts through integrity verification, expiration checks, and scope alignment prior to effectuation. Such validation preserves policy-bound execution scope and prevents unauthorized expansion of authority when actions traverse institutional or system boundaries by denying or deferring effectuation upon validation failure.

REFERENCE LIST

100A—FIRST GOVERNANCE CONTROL PLANE
100B—SECOND GOVERNANCE CONTROL PLANE
130—POLICY CONSTRAINT ENGINE
150—AUDIT RECORD MODULE
152—AUDIT RECORD STORE
160—EXECUTION INTERFACE
190—EXTERNAL CAPABILITIES
300—AGENT EXECUTION CONTEXT
304—POLICY ARTIFACT
420—PROPOSED ACTION
422—AUTHORIZATION OUTCOME
1200—AUTHORIZATION ARTIFACT
1210—AUTHORIZATION ARTIFACT INTEGRITY VALUE
1220—AUTHORIZATION ARTIFACT VALIDATION
1222—AUTHORIZATION ARTIFACT INTEGRITY VERIFIED
1224—SCOPE DISCLOSURE VERIFICATION CONFIRMED
1250—SCOPE DISCLOSURE ARTIFACT

The invention claimed is:

1. A computer-implemented governance control plane comprising a runtime control architecture for controlling execution of artificial intelligence agents in a regulated environment, the governance control plane comprising one or more processors and memory storing instructions that, when executed by the one or more processors, cause the governance control plane to:

(a) receive a request comprising one or more inputs and instantiate, responsive thereto, an agent execution context bound to metadata including at least one of identity, role, credential lineage, organizational affiliation, jurisdiction, risk classification, purpose constraint, time or session scope constraint, or delegation authority;

(b) select, based on the metadata of the agent execution context, at least one policy artifact identified by a policy identifier and version;

(c) operate a supervisory orchestration layer configured to route governed context associated with the agent execution context to one or more reasoning engines, the supervisory orchestration layer being independent of model architecture and independent of output modality;

(d) receive, from the one or more reasoning engines, at least one proposed output or proposed action and determine a machine-computed action classification derived from structured operational attributes associated with the proposed output or proposed action, the machine-computed action classification being provided as an input to a policy constraint engine;

(e) evaluate, using a policy constraint engine and the selected policy artifact, the proposed output or proposed action against one or more policy constraints applicable to the agent execution context and generate an authorization outcome selected from allow, deny, modify, defer, or escalate;

(f) control execution of the proposed output or proposed action based on the authorization outcome, including preventing effectuation prior to invocation of the external capability by at least one of withholding dispatch, blocking delivery, preventing a tool call, suppressing a downstream invocation, or terminating an in-progress invocation when policy requirements are not satisfied, wherein invocation of the external capability is mediated through an execution interface operating as a runtime mediation boundary between the one or more reasoning engines and the external capability, the execution interface operating as the sole permitted pathway for invocation, such that invocation requires validation at the execution interface and direct invocation outside the execution interface is prevented;

(g) govern multi-agent delegation associated with the agent execution context by validating a delegation chain and enforcing one or more delegation constraints comprising at least one of privilege inheritance limitation, recursion detection, cycle detection, escalation control, or revocation;

(h) enforce policy-defined obligations by maintaining one or more obligation objects associated with the agent execution context, computing for each obligation object an expiration timestamp based on a defined start condition, detecting, based on evaluation of a normalized event stream, an omission when a required event is absent prior to the expiration timestamp, and applying a policy-defined response that restricts, suspends, or blocks effectuation under the agent execution context; and (i) generate and append to an audit record store a governed audit record capturing at least the selected policy identifier and version, the authorization outcome and a corresponding enforcement action, delegation validation results, and any omission event, wherein the audit record store is configured such that modification of stored governed audit records is detectable.

2. The governance control plane of claim 1, wherein the request comprises one or more inputs selected from text, audio, video, structured data, streaming signal data, embeddings, ENGRAM-derived contextual representations, or event-triggered information.

3. The governance control plane of claim 1, wherein the supervisory orchestration layer routes governed context to a plurality of heterogeneous reasoning engines including at least one language model and at least one non-language processing engine selected from retrieval, classification, risk scoring, signal analysis, or workflow execution.

4. The governance control plane of claim 1, wherein the action classification categorizes the proposed output or proposed action as at least one of text delivery, notification, workflow action, tool invocation, application programming interface call, device command, or downstream service invocation.

5. The governance control plane of claim 1, wherein validating the delegation chain comprises computing an effective privilege set for a delegated execution context by limiting inherited privileges to an intersection of privileges associated with a delegating execution context and policy-defined inheritance limits, and further constraining the effective privilege set according to at least one temporal scope, obligation state, revocation condition, or policy-defined invalidation condition.

6. The governance control plane of claim 1, wherein recursion or cycle detection comprises identifying a repeated identifier within the delegation chain, the repeated identifier comprising at least one of an agent identity, an execution context identifier, a task identifier, or a delegation edge identifier.

7. The governance control plane of claim 1, wherein each obligation object further comprises an applicability condition and a remediation workflow identifier, and wherein applying the policy-defined response comprises invoking the remediation workflow.

8. The governance control plane of claim 1, wherein detecting an omission further comprises determining absence of a required data source or signal channel prior to expiration of a defined time window.

9. The governance control plane of claim 1, further configured to generate a scope-disclosure artifact representing at least reviewed data sources, unreviewed or unavailable data sources, and identified conflicts associated with the proposed output or proposed action.

10. The governance control plane of claim 9, wherein controlling execution further comprises preventing effectuation or blocking delivery of the proposed output or proposed action until the scope-disclosure artifact is associated with the proposed output or proposed action.

11. The governance control plane of claim 1, wherein each governed audit record includes an enforcement-action identifier and is cryptographically linked to a prior governed audit record using a hash-based linkage.

12. The governance control plane of claim 1, further comprising a session memory governance module configured to limit retention of context associated with the agent execution context according to at least one of a time bound, token bound, purpose bound, or privacy constraint.

13. A computer-implemented governance control plane comprising an effectuation mediation component configured to control effectuation of capabilities in a regulated environment, the governance control plane comprising one or more processors and memory storing instructions that, when executed, cause the governance control plane to:

(a) receive a proposed action generated by one or more reasoning engines, the proposed action being directed to a capability;

(b) associate the proposed action with an agent execution context bound to metadata and determine a machine-computed action classification for the proposed action based on structured operational attributes associated with the proposed action;

(c) obtain capability metadata corresponding to the capability, the capability metadata comprising at least an identifier and one or more constraint parameters;

(d) evaluate, using a policy constraint engine and at least one policy artifact applicable to the agent execution context, whether the proposed action is authorized and generate an authorization outcome comprising at least one of allow, deny, modify, defer, or escalate;

(e) enforce the authorization outcome at runtime via the effectuation mediation component by permitting, preventing, modifying, deferring, or terminating effectuation, such that the proposed action is not directly effectuated against the capability by the one or more reasoning engines, wherein invocation of the capability is mediated through the effectuation mediation component as the exclusive pathway for invocation, and direct invocation outside the effectuation mediation component is prevented through one or more technical enforcement mechanisms restricting network-level, credential-level, or interface-level access to the capability by the one or more reasoning engines; and (f) generate and append to an audit record store a governed audit record capturing at least the action classification, an identifier of the capability, a policy identifier and version, the authorization outcome, and an enforcement action.

14. The governance control plane of claim 13, wherein the effectuation mediation component is positioned as a sole egress pathway through which effectuation of capabilities is performed for at least one class of proposed actions, including at least one of tool calls, workflow actions, device commands, downstream service invocations, internal service endpoints, or inter-process or inter-service interfaces, such that the one or more reasoning engines are restricted from directly invoking the capability outside the effectuation mediation component and wherein the restriction is enforced through technical controls preventing network-level, credential-level, or interface-level access to the capability by the one or more reasoning engines.

15. The governance control plane of claim 13, wherein modifying the proposed action comprises applying one or more constraint parameters or structural transformations to the proposed action prior to effectuation, including at least one of narrowing a permitted scope, redacting or substituting one or more parameters, selecting an alternate action variant, rate limiting effectuation, partitioning the proposed action into multiple sub-actions, or applying privilege limitations derived from capability metadata or from an effective privilege set.

16. The governance control plane of claim 13, wherein deferring effectuation comprises withholding dispatch or suppressing invocation until satisfaction of at least one prerequisite condition, the prerequisite condition comprising at least one of:

(i) validation of an authorization artifact that is valid for a defined scope and time window;

(ii) detection, prior to expiration of a deterministically defined time window, of a required event in a normalized event stream associated with the agent execution context; or (iii) generation or validation of a scope-disclosure artifact associated with the proposed action.

17. A computer-implemented method performed by a governance control plane for governing execution of artificial intelligence agents in a regulated environment, the method comprising:

(a) receiving a request and instantiating an agent execution context bound to metadata;

(b) selecting at least one policy artifact applicable to the agent execution context;

(c) routing governed context to one or more reasoning engines independent of model architecture and output modality;

(d) receiving a proposed output or proposed action and determining an action classification;

(e) evaluating the proposed output or proposed action against one or more policy constraints and generating an authorization outcome;

(f) gating execution of the proposed output or proposed action based on the authorization outcome, including, when the proposed output or proposed action would alter an external capability, mediating invocation through the execution interface, the execution interface operating as a sole permitted pathway for invocation of the external capability, wherein invocation requires validation at the execution interface and direct invocation outside the execution interface is prevented;

(g) validating a delegation chain and enforcing delegation constraints;

(h) maintaining obligation objects, monitoring a normalized event stream, detecting an omission upon absence of a required event prior to expiration of a time window, and applying a policy-defined response that restricts, suspends, or blocks effectuation under the agent execution context; and (i) appending to an audit record store a governed audit record configured to enable detection of modification capturing the authorization outcome and any enforcement actions.

18. The method of claim 17, further comprising transmitting an authorization artifact to a receiving node and validating the authorization artifact at the receiving node against at least a policy identifier and version prior to effectuation.

19. The method of claim 17, further comprising generating a scope-disclosure artifact representing reviewed and unreviewed data sources associated with the proposed output or proposed action.

20. The method of claim 17, wherein escalating the proposed output or proposed action is triggered when at least one of the risk classification of the agent execution context exceeds a threshold, delegation authority is insufficient, a restricted action classification is detected, or an omission event occurs.

* * * * *